US012618964B2

(12) United States Patent     (10) Patent No.:   US 12,618,964 B2

Amir et al.     (45) Date of Patent:    May 5, 2026

---

(54) STATE DETECTION

(71) Applicant: Essence SmartCare Ltd., Herzeliya Pituach (IL)

(72) Inventors: Ohad Amir, Herzlia (IL); Jonathan Mark Schnapp, Tel Aviv (IL); Ilan Hevdeli, Ganei-Tikva (IL); Benyamin Finkelstein, Yavne (IL); Boaz Menis, Kibbutz NaAn (IL)

(73) Assignee: Essence SmartCare Ltd., Herzeliya Pituach (IL)

( * ) Notice: Subject to any disclaimer, the term of this patent is extended or adjusted under 35 U.S.C. 154(b) by 338 days.

(21) Appl. No.: 17/790,491

(22) PCT Filed: Dec. 29, 2020

(86) PCT No.: PCT/IL2020/051345

§ 371 (c)(1),
(2) Date: Jun. 30, 2022

(87) PCT Pub. No.: WO2021/137220

PCT Pub. Date: Jul. 8, 2021

(65) Prior Publication Data

US 2023/0055654 A1     Feb. 23, 2023

(30) Foreign Application Priority Data

Dec. 31, 2019    (GB) ..................................... 1919449

(51) Int. Cl.
    *G01S 13/88*      (2006.01)
    *G01B 15/02*      (2006.01)
    (Continued)

(52) U.S. Cl.
    CPC ............ *G01S 13/88* (2013.01); *G01B 15/025* (2013.01); *G01S 13/584* (2013.01); *G08B 21/043* (2013.01); *G08B 29/183* (2013.01)

(58) Field of Classification Search
    CPC ........ G01S 13/886; G01S 13/88; G01S 7/415; G01S 7/417; G01S 7/4802; G08B 21/0469; G08B 21/043; G08B 21/0492
    (Continued)

(56) References Cited

U.S. PATENT DOCUMENTS 4,882,567 A    11/1989   Johnson
7,463,182 B1 *   12/2008   Morinaga ............. G01S 13/931
                                       342/107

(Continued)

FOREIGN PATENT DOCUMENTS

CN       1670780 A     9/2005
CN     108806190 A    11/2018

(Continued)

OTHER PUBLICATIONS

Foreign Communication from a Related Counterpart Application, Extended European Search Report dated May 22, 2024, European Patent Application No. 24157141.3 filed on Dec. 30, 2020.

(Continued)

*Primary Examiner* — Michael W Justice
(74) *Attorney, Agent, or Firm* — Conley Rose, P.C.

(57)            ABSTRACT

Embodiments relate to using an active reflected wave detector to classify the state of a person in an environment and optionally respond accordingly. In one embodiment there is provided a computer implemented method of determining a state of a person comprising: receiving an output of an active reflected wave detector; classifying a state of the person as being in a safe supported state based on the output using measurements of reflections associated with the person, wherein said classifying is based at least on: a height metric associated with at least one reflection from the person conveyed in the output of the active reflected wave detector; and a plurality of velocity magnitude measurements of the (Continued)

300

106

302

304

308

306

D person corresponding to different times, each of said velocity magnitude measurements determined using the reflections associated with the person conveyed in the output of the active reflected wave detector.

20 Claims, 8 Drawing Sheets

(51) Int. Cl.
*G01S 13/58* (2006.01)
*G08B 21/04* (2006.01)
*G08B 29/18* (2006.01)

(58) Field of Classification Search
USPC ................................ 342/28, 123; 340/573.7
See application file for complete search history.

(56) References Cited

U.S. PATENT DOCUMENTS

| | | | | |
|---|---|---|---|---|
| 7,567,200 | B1 | 7/2009 | Osterweil | |
| 7,893,844 | B2 * | 2/2011 | Gottlieb | G08B 21/0446 |
| | | | | 340/539.12 |
| 7,916,066 | B1 | 3/2011 | OsterWeil | |
| 8,068,051 | B1 | 11/2011 | Osterweil | |
| 8,742,935 | B2 * | 6/2014 | Cuddihy | G08B 21/0469 |
| | | | | 340/573.7 |
| 9,576,468 | B2 * | 2/2017 | Zack | H04B 1/7163 |
| 9,638,800 | B1 * | 5/2017 | Skowronek | G01S 15/42 |
| 9,784,820 | B2 * | 10/2017 | Arage | G01S 13/931 |
| 9,824,570 | B1 * | 11/2017 | Skowronek | G01S 15/86 |
| 9,921,309 | B1 * | 3/2018 | Skowronek | G01S 17/86 |
| 10,226,204 | B2 * | 3/2019 | Heaton | A61B 5/7264 |
| 10,380,860 | B2 | 8/2019 | Amir et al. | |
| 10,410,498 | B2 * | 9/2019 | Coke | G08B 21/0476 |
| 10,663,580 | B2 * | 5/2020 | Sakamaki | G01S 13/931 |
| 10,901,069 | B2 * | 1/2021 | Otsuki | G08B 21/0423 |
| 10,929,653 | B2 * | 2/2021 | Yan | G06V 40/25 |
| 11,074,800 | B2 * | 7/2021 | Li | G01S 13/89 |
| 11,099,258 | B2 * | 8/2021 | Buddendick | G01S 13/42 |
| 11,391,818 | B2 * | 7/2022 | Buddendick | G01S 13/34 |
| 11,906,657 | B2 * | 2/2024 | Preece | G06N 3/045 |
| 2006/0001545 | A1 * | 1/2006 | Wolf | A47K 3/001 |
| | | | | 340/686.1 |
| 2006/0145874 | A1 | 7/2006 | Fredriksson et al. | |
| 2011/0032139 | A1 | 2/2011 | Benitez et al. | |
| 2012/0116252 | A1 | 5/2012 | Newman et al. | |
| 2013/0041856 | A1 | 2/2013 | Benitez et al. | |
| 2013/0082842 | A1 | 4/2013 | Balazs et al. | |
| 2014/0145848 | A1 | 5/2014 | Amir | |
| 2014/0155729 | A1 | 6/2014 | Saitoh | |
| 2014/0362213 | A1 | 12/2014 | Tseng | |
| 2016/0084941 | A1 * | 3/2016 | Arage | G01S 7/2921 |
| | | | | 342/91 |
| 2016/0267327 | A1 | 9/2016 | Franz et al. | |
| 2016/0377704 | A1 | 12/2016 | Harash et al. | |
| 2017/0074980 | A1 * | 3/2017 | Adib | G01S 13/878 |
| 2017/0169691 | A1 | 6/2017 | Kirenko et al. | |
| 2017/0328995 | A1 | 11/2017 | Marschalkowski et al. | |
| 2018/0000385 | A1 * | 1/2018 | Heaton | G08B 25/016 |
| 2018/0070889 | A1 | 3/2018 | Lee et al. | |
| 2018/0137735 | A1 * | 5/2018 | Matsuoka | A61B 5/1112 |
| 2018/0192919 | A1 | 7/2018 | Nakayama et al. | |
| 2018/0284223 | A1 * | 10/2018 | Otsuki | G01S 7/412 |
| 2018/0292523 | A1 * | 10/2018 | Orenstein | A61B 5/1113 |
| 2018/0314253 | A1 | 11/2018 | Mercep et al. | |
| 2018/0330593 | A1 | 11/2018 | Zack et al. | |
| 2019/0108740 | A1 * | 4/2019 | Coke | G01S 13/89 |
| 2019/0108913 | A1 | 4/2019 | Coke et al. | |
| 2019/0110741 | A1 * | 4/2019 | Ishii | A61B 5/1077 |
| 2019/0130725 | A1 * | 5/2019 | Dempsey | G08B 7/06 |
| 2019/0137606 | A1 * | 5/2019 | Buddendick | G01S 13/536 |
| 2019/0313948 | A1 | 10/2019 | Matsunaga et al. | |
| 2019/0318162 | A1 * | 10/2019 | Yan | G01S 13/931 |

| | | | | |
|---|---|---|---|---|
| 2020/0103499 | A1 * | 4/2020 | Preece | G06N 3/04 |
| 2020/0116824 | A1 * | 4/2020 | Yang | G01S 13/87 |
| 2020/0124706 | A1 * | 4/2020 | Buddendick | G01S 13/343 |
| 2020/0143656 | A1 * | 5/2020 | Li | G08B 21/043 |
| 2022/0089237 | A1 * | 3/2022 | Sverdlov | B25J 9/1697 |
| 2023/0018686 | A1 * | 1/2023 | Shin | A61B 5/747 |

FOREIGN PATENT DOCUMENTS

| | | | |
|---|---|---|---|
| CN | 109239706 | A | 1/2019 |
| CN | 109765552 | A | 5/2019 |
| CN | 110179471 | A | 8/2019 |
| CN | 110703241 | A | 1/2020 |
| CN | 111166342 | A | 5/2020 |
| CN | 112363160 | A | 2/2021 |
| DE | 10024778 | A1 | 11/2001 |
| EP | 0367402 | A1 | 5/1990 |
| EP | 2533219 | A1 | 12/2012 |
| EP | 2875500 | A1 | 5/2015 |
| JP | H08220250 | A | 8/1996 |
| JP | 2006153878 | A | 6/2006 |
| JP | 2008220250 | A | 9/2008 |
| JP | 2013149156 | A | 8/2013 |
| JP | 2014106636 | A | 6/2014 |
| JP | 2015082265 | A | 4/2015 |
| JP | 2015138460 | A | 7/2015 |
| JP | 2016192998 | A | 11/2016 |
| JP | 2019158862 | A | 9/2019 |
| WO | 2004014230 | A1 | 11/2005 |
| WO | 2016155789 | A1 | 10/2016 |
| WO | 2016193972 | A2 | 12/2016 |
| WO | 2015083348 | A1 | 3/2017 |
| WO | 2019070570 | A1 | 4/2019 |
| WO | 2019231861 | A1 | 12/2019 |
| WO | 2020223283 | A1 | 11/2020 |
| WO | 2021118570 | A1 | 6/2021 |
| WO | 2021137215 | A1 | 7/2021 |
| WO | 2021137220 | A1 | 7/2021 |
| WO | 2021137227 | A2 | 7/2021 |

OTHER PUBLICATIONS

Foreign Communication from a Related Counterpart Application, International Search Report and Written Opinion dated Aug. 3, 2021, International Application No. PCT/IL2020/051353 filed on Dec. 30, 2020.

Foreign Communication from a Related Counterpart Application, International Combined Search and Examination Report dated Sep. 13, 2021, Great Britain Application No. 2110780.0 filed on Jul. 27, 2021.

Foreign Communication from a Related Counterpart Application, Examination Report dated Oct. 29, 2021, Great Britain Application No. 2110780.0 filed on Jul. 27, 2021.

Foreign Communication from a Related Counterpart Application, International Combined Search and Examination Report dated Jun. 23, 2020, Great Britain Application No. 1919446.3 filed on Dec. 31, 2019.

Foreign Communication from a Related Counterpart Application, International Preliminary Report on Patentability dated Jul. 5, 2022, International Application No. PCT/IL2020/051353 filed on Dec. 30, 2020.

Foreign Communication from a Related Counterpart Application, International Combined Search and Examination Report dated Jun. 23, 2020, Great Britain Application No. 1919449.7 filed on Dec. 31, 2019.

Foreign Communication from a Related Counterpart Application, International Preliminary Report on Patentability dated Jul. 5, 2022, International Application No. PCT/IL2020/051345 filed on Dec. 29, 2020.

Foreign Communication from a Related Counterpart Application, International Combined Search and Examination Report dated Jun. 25, 2020, Great Britain Application No. 1919450.5 filed on Dec. 31, 2019.

Hevdeli, Ilan , et al., "Active Reflected Wave Monitoring," filed Jun. 30, 2022, U.S. Appl. No. 17/790,495.

(56)          References Cited

OTHER PUBLICATIONS

Amir, Ohad, et al., "A Device for Monitoring an Environment," filed Jun. 30, 2022, U.S. Appl. No. 17/790,494.

Foreign Communication from a Related Counterpart Application, International Search Report and Written Opinion dated Apr. 16, 2021, International Application No. PCT/IL2020/051336 filed on Dec. 28, 2020.

A Patentseekers Patentability Search Report that was prepared for UK application GB1919449.7 which corresponds to U.S. Appl. No. 17/790,491.

Foreign Communication from a Related Counterpart Application, Japanese Office Action dated Jul. 10, 2024, Japanese Patent Application No. 2022-540789 filed on Mar. 7, 2023.

Okuzumi, "5.6—Age-related changes in standing balance and falls in the elderly," Human measurement Handbook, First Edition, Sep. 1, 2003, pp. 793-798.

Foreign Communication from a Related Counterpart Application, Japanese Office Action dated Jan. 9, 2024, Japanese Patent Application No. 2022-540788 filed on Dec. 30, 2020.

Foreign Communication from a Related Counterpart Application, International Search Report and Written Opinion dated Jun. 28, 2021, International Application No. PCT/IL2020/051345 filed on Dec. 29, 2020.

Office Action dated Sep. 6, 2024 U.S. Appl. No. 17/790,495, filed Jun. 30, 2022.

Office Action dated Feb. 19, 2025, U.S. Appl. No. 17/790,494, filed Jun. 30, 2022.

Foreign Communication from a Related Counterpart Application, European Office Action dated Mar. 22, 2024, European Patent Application No. 20845239.1 filed on Jul. 13, 2022.

Foreign Communication from a Related Counterpart Application, European Office Action dated Mar. 22, 2024, European Patent Application No. 20845238.3 filed on Jul. 13, 2022.

Notice of Allowance dated Sep. 10, 2025, U.S. Appl. No. 17/790,494, filed Jun. 30, 2022.

* cited by examiner

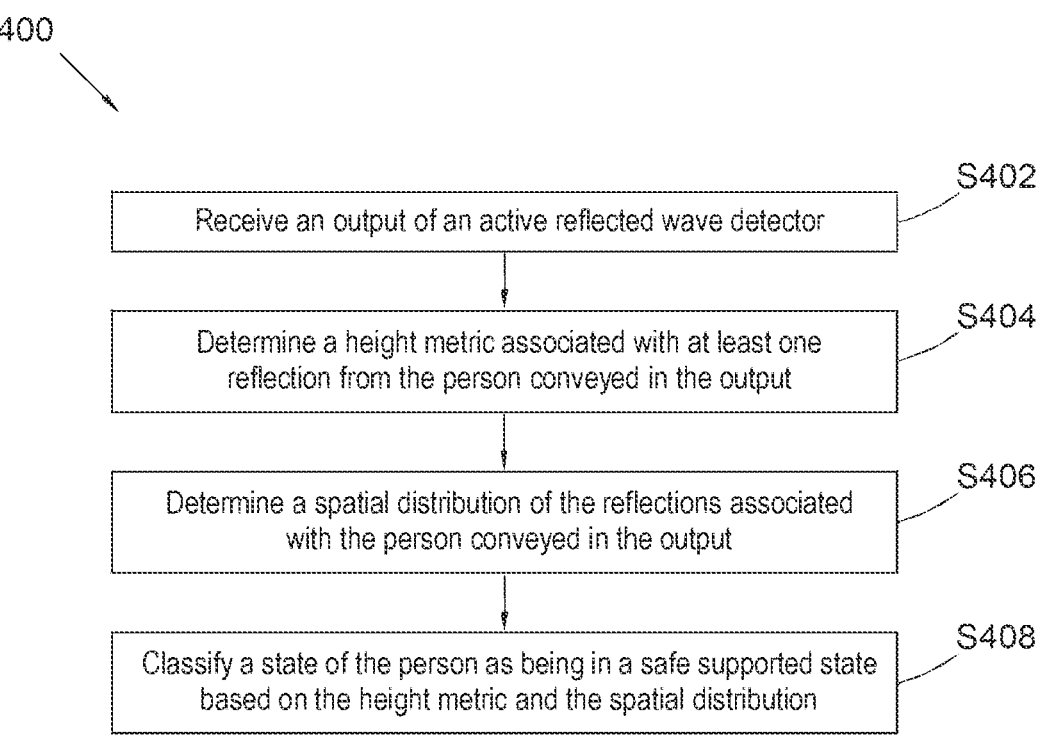

400

Receive an output of an active reflected wave detector — S402

Determine a height metric associated with at least one reflection from the person conveyed in the output — S404

Determine a spatial distribution of the reflections associated with the person conveyed in the output — S406

Classify a state of the person as being in a safe supported state based on the height metric and the spatial distribution — S408

Receive an output of an active reflected wave detector

S504

Determine a height metric associated with at least one reflection from the person conveyed in the output

S506

Determine a velocity of the person present in the environment

S508

Classify a state of the person as being in a safe supported state based on the height metric and the velocity

600

S602
Receive an output of an active reflected wave detector

S604
Determine a velocity of the person present in the environment

S606
Determine a height metric associated with at least one reflection from the person conveyed in the output S608
Classify a state of the person as being in a crawling state based on the height metric and the velocity

700

S702
Receive an output of an active reflected wave detector

S704
Determine a velocity of the person present in the environment

S706
Determine a height metric associated with at least one reflection from the person conveyed in the output S708
Classify a state of the person as being in a fall state based on the height metric and the velocity

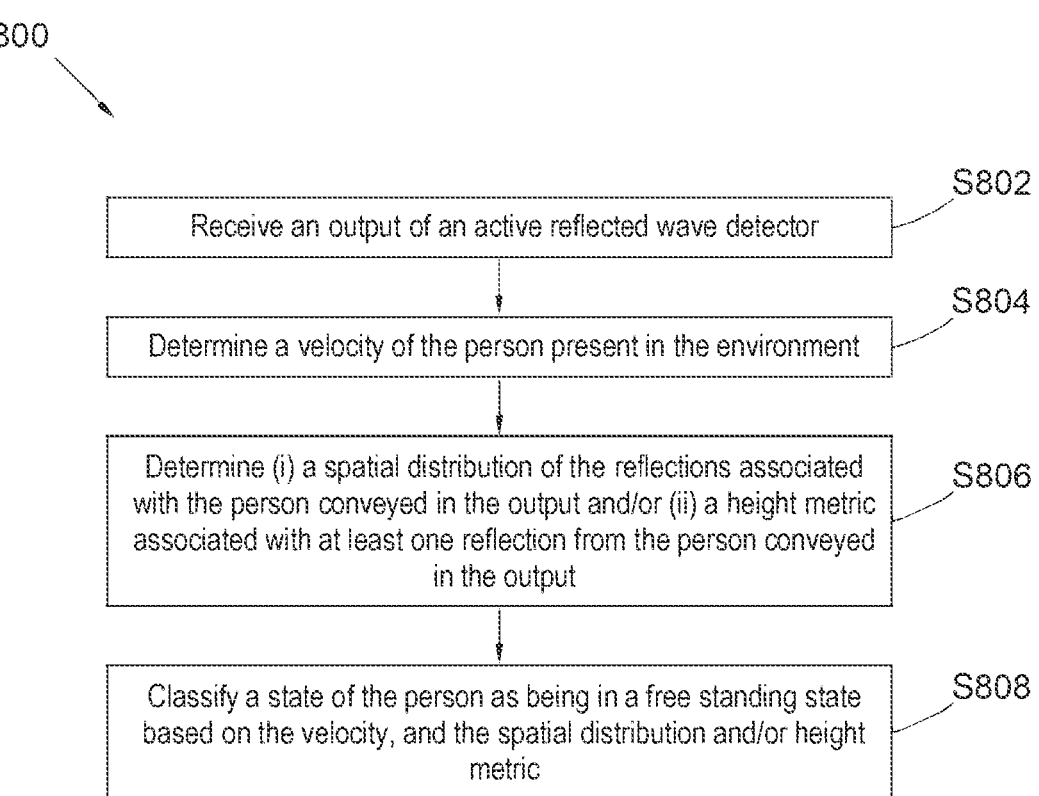

800

S802

Receive an output of an active reflected wave detector

S804

Determine a velocity of the person present in the environment

S806

Determine (i) a spatial distribution of the reflections associated with the person conveyed in the output and/or (ii) a height metric associated with at least one reflection from the person conveyed in the output

S808

Classify a state of the person as being in a free standing state based on the velocity, and the spatial distribution and/or height metric

Figure 8

STATE DETECTION

CROSS-REFERENCE TO RELATED APPLICATIONS

The present application is a filing under 35 U.S.C. 371 as the National Stage of International Application No. PCT/IL2020/051345, filed Dec. 29, 2020, entitled "STATE DETECTION," which claims priority to United Kingdom Application No. 1919449.7 filed with the Intellectual Property Office of the United Kingdom on Dec. 31, 2019, both of which are incorporated herein by reference in their entirety for all purposes.

TECHNICAL FIELD

The present invention relates generally to a device and method for determining a state of a person in an environment.

BACKGROUND

There is a need to use a monitoring system to automatically detect a status and/or presence of a person in a designated space, for example in an interior of a building. For example, an elderly person may end up in a hazardous situation in which they are unable to call for help, or unable to do so quickly. One such situation may be if they have fallen.

Some known systems have been developed in which the person wears a pendant which has an accelerometer in it to detect a fall based on kinematics. The pendant upon detecting a fall can transmit an alert signal. However the person may not want to wear, or may be in any case not wearing, the pendant.

Other reflected-wave based systems such as radar (whether radio wave, microwave or millimeter wave), lidar or sonar, are known to monitor a person in a designated space.

SUMMARY

The inventors have identified that there is a need to accurately identify the state of a person in an environment.

For example, incorrectly identifying a person as being in a fall state can lead to significant power and network resources being consumed in the generation and transmission of a fall detection alert to a remote device, and may result in an unnecessary response from a monitoring station.

In embodiments described herein an active reflected wave detector is used to accurately classify the state of a person in the environment and optionally respond accordingly.

According to one aspect of the present disclosure there is provided a computer implemented method of determining a state of a person in an environment, the method comprising: receiving an output of an active reflected wave detector; classifying a state of the person as being in a safe supported state based on the output of the active reflected wave detector, wherein said classifying uses measurements of reflections associated with the person conveyed in the output of the active reflected wave detector, and said classifying is based at least on: a height metric associated with at least one reflection from the person conveyed in the output of the active reflected wave detector; and a plurality of velocity magnitude measurements of the person corresponding to different times, each of said velocity magnitude measurements determined using the reflections associated with the person conveyed in the output of the active reflected wave detector.

According to another aspect of the present disclosure there is provided a device for determining a state of a person in an environment, the device comprising a processor configured to: receive an output of an active reflected wave detector; classify a state of the person as being in a safe supported state based on the output of the active reflected wave detector, wherein said classification uses measurements of reflections associated with the person conveyed in the output of the active reflected wave detector, and said classification is based at least on: a height metric associated with at least one reflection from the person conveyed in the output of the active reflected wave detector; and a plurality of velocity magnitude measurements of the person corresponding to different times, each of said plurality of velocity magnitude measurements determined using the reflections associated with the person conveyed in the output of the active reflected wave detector.

According to another aspect of the present disclosure there is provided a computer implemented method of determining a state of a person in an environment, the method comprising: receiving an output of an active reflected wave detector; classifying the state of the person as being in a crawling state based on the output of the active reflected wave detector, wherein said classifying uses measurements of reflections associated with the person conveyed in the output of the active reflected wave detector, and said classifying is based at least on: a plurality of velocity magnitude measurements of the person corresponding to different times, each of said plurality of velocity magnitude measurements determined using the reflections associated with the person conveyed in the output of the active reflected wave detector; and a height metric associated with at least one reflection from the person conveyed in the output of the active reflected wave detector.

According to another aspect of the present disclosure there is provided a device for determining a state of a person in an environment, the device comprising a processor configured to: receive an output of an active reflected wave detector; classify the state of the person as being in a crawling state based on the output of the active reflected wave detector, wherein said classification uses measurements of reflections associated with the person conveyed in the output of the active reflected wave detector, and said classification is based at least on: a plurality of velocity magnitude measurements of the person corresponding to different times, each of said plurality of velocity magnitude measurements determined using the reflections associated with the person conveyed in the output of the active reflected wave detector; and a height metric associated with at least one reflection from the person conveyed in the output of the active reflected wave detector.

According to another aspect of the present disclosure there is provided a computer implemented method of determining a state of a person in an environment, the method comprising: receiving an output of an active reflected wave detector; classifying a state of the person as being in a free-standing state based on the output of the active reflected wave detector, wherein said classifying uses measurements of reflections associated with the person conveyed in the output of the active reflected wave detector, and said classifying is based at least on: a plurality of velocity magnitude measurements of the person corresponding to different times, each of said plurality of velocity magnitude measurements determined using the reflections associated with the person conveyed in the output of the active reflected wave detector; and at least one of: (i) a spatial distribution of the measurements of the reflections associated with the person conveyed in the output of the active reflected wave detector; and (ii) a height metric associated with at least one reflection from the person conveyed in the output of the active reflected wave detector.

According to another aspect of the present disclosure there is provided a device for determining a state of a person in an environment, the device comprising a processor configured to receive an output of an active reflected wave detector; classify a state of the person as being in a free-standing state based on the output of the active reflected wave detector, wherein said classification uses measurements of reflections associated with the person conveyed in the output of the active reflected wave detector, and said classification is based at least on: a plurality of velocity magnitude measurements of the person corresponding to different times, each of said plurality of velocity magnitude measurements determined using the reflections associated with the person conveyed in the output of the active reflected wave detector; and at least one of: (i) a spatial distribution of the measurements of the reflections associated with the person conveyed in the output of the active reflected wave detector; and (ii) a height metric associated with at least one reflection from the person conveyed in the output of the active reflected wave detector.

According to another aspect of the present disclosure there is provided a computer implemented method of determining a state of a person in an environment, the method comprising: receiving an output of an active reflected wave detector; classifying the state of the person based on the output of the active reflected wave detector, wherein said classifying uses measurements of reflections associated with the person conveyed in the output of the active reflected wave detector, and said classifying is based on: a height metric associated with at least one reflection from the person conveyed in the output of the active reflected wave detector; and determining a total displacement of a centre of mass of said person across said environment over a time period, and said classifying is further based on the total displacement.

According to another aspect of the present disclosure there is provided a computer-readable storage medium comprising instructions which, when executed by a processor cause the processor to perform the method steps of one or more embodiments described herein.

The instructions may be provided on one or more carriers. For example there may be one or more non-transient memories, e.g. a EEPROM (e.g a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which:

FIG. 4 illustrates a process for a first method of determining that a person is in a safe supported state;

FIG. 8 illustrates a process for determining that a person is in a free-standing state.

DETAILED DESCRIPTION

Figure 1:
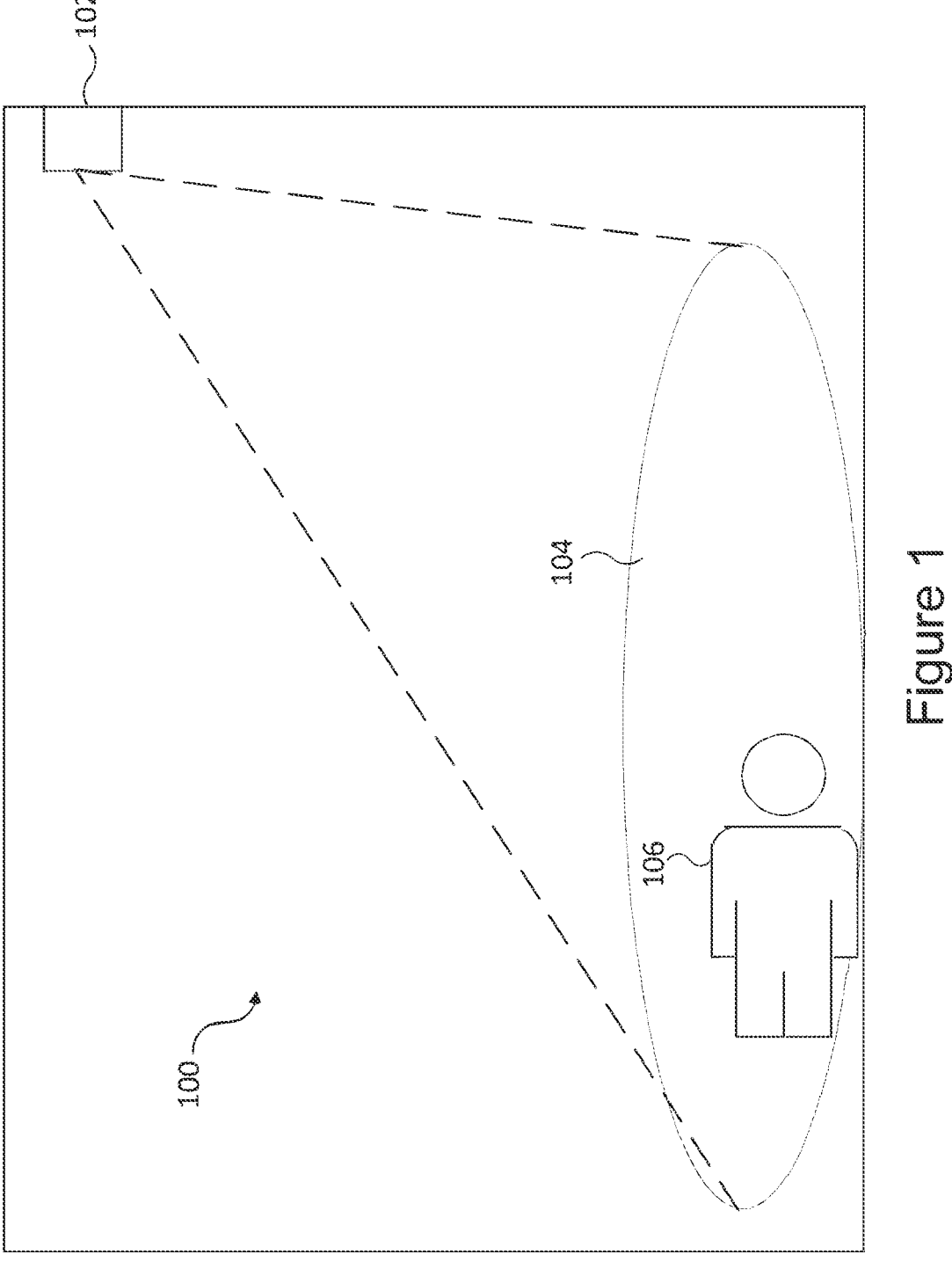
FIG. 1 illustrates an environment in which a device has been positioned.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents. In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises", "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor Specific embodiments will now be described with reference to the drawings.

FIG. 1 illustrates an environment 100 in which a device 102 has been positioned. The environment 100 may for example be an indoor space such as a room of a home, a nursing home, a public building or other indoor space. Alternatively the environment may be an outdoor space such as a garden. The device 102 is configured to monitor a space 104 in the environment 100 in which a person 106 may be present.

An embodiment of the present invention relates to the detection of a state of a person 106 in the environment. An embodiment relates to the detection of a person having fallen (that is, being in a fall position) which is illustrated in FIG. 1.

Figure 2:
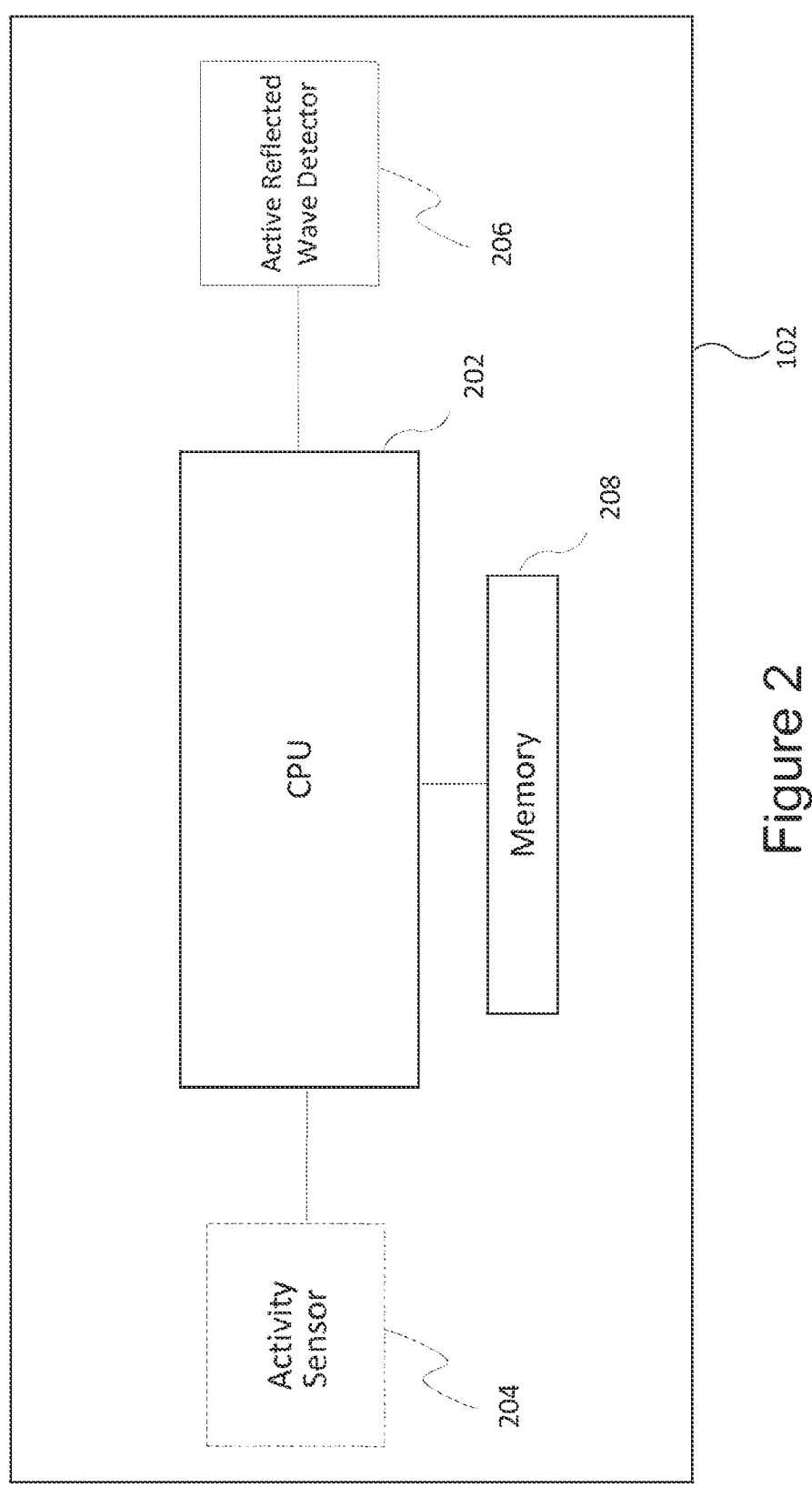
FIG. 2 is a schematic block diagram of the device.

FIG. 2 illustrates a simplified view of the device 102. A shown in FIG. 2, the device 102 comprises a central processing unit ("CPU") 202, to which is connected a memory 208. The functionality of the CPU 202 described herein may be implemented in code (software) stored on a memory (e.g. memory 208) comprising one or more storage media, and arranged for execution on a processor comprising on or more processing units. The storage media may be integrated into and/or separate from the CPU 202. The code is configured so as when fetched from the memory and executed on the processor to perform operations in line with embodiments discussed herein. Alternatively it is not excluded that some or all of the functionality of the CPU 202 is implemented in dedicated hardware circuitry, or configurable hardware circuitry like an FPGA.

FIG. 2 shows the CPU 202 being connected to an activity sensor 204 and an active reflected wave detector 206. It will be appreciated from the below that in some embodiments, the activity sensor 204 may not be present. In embodiments where the device 102 comprises the activity sensor 204, the active reflected wave detector 206 consumes more power in an activated state (i.e. when turned on and operational) than the activity sensor 204 does when in an activated state.

While in the illustrated embodiment the activity sensor 204 and reflected wave detector are separate from the CPU 202, in other embodiments, at least part of processing aspects of the activity sensor 204 and/or active reflected wave detector 206 may be provided by a processor that also provides the CPU 202, and resources of the processor may be shared to provide the functions of the CPU 202 and the processing aspects activity sensor 204 and/or active reflected wave detector 206. Similarly, functions of the CPU 202, such as those described herein, may be performed in the activity sensor 204 and/or the active reflected wave detector 206. It will be appreciated from the below that in some embodiments, the activity sensor 204 may not be present. In embodiments where the device 102 comprises the activity sensor 204, the active reflected wave detector 206 consumes more power in an activated state (i.e. when turned on and operational) than the activity sensor 204 does when in an activated state.

As shown in FIG. 2, the device 102 may house both the activity sensor 204 and the active reflected wave detector 206. Alternatively, the activity sensor 204 may be external to the device 102 and be coupled to the CPU 202 by way of a wired or wireless connection. Similarly, the active reflected wave detector 206 may be external to the device 102 and be coupled to the CPU 202 by way of a wired or wireless connection.

In some embodiments, the CPU 202 is configured to detect the presence of a person in the monitored space 104, and if a person is present, classify the state of the person based on an output of the active reflected wave detector 206.

The active reflected wave detector 206 may operate in accordance with one of various reflected wave technologies.

The active reflected wave detector 206 may be a ranging detector. That is, in contrast with Doppler-only detectors, the active reflected wave detector 206 may be configured to determine the location of an object (e.g. a person) in its field of view. This enables the CPU 202 to track the location of an object in the environment.

Preferably, the active reflected wave detector 206 is a radar sensor. The radar sensor 206 may use millimeter wave (mmWave) sensing technology. The radar is, in some embodiments, a continuous-wave radar, such as frequency modulated continuous wave (FMCW) technology. Such a chip with such technology may be, for example, Texas Instruments Inc. part number IWR6843. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimeter waves in the 30 GHz to 300 GHz range. In some embodiments, the radar has a bandwidth of at least 1 GHz. The active reflected wave detector 206 may comprise antennas for both emitting waves and for receiving reflections of the emitted waves, and in some embodiment different antennas may be used for the emitting compared with the receiving.

The active reflected wave detector 206 is not limited to being a radar sensor, and in other embodiments alternative ranging detectors may be used, for example the active reflected wave detector 206 may be a lidar sensor, or a sonar sensor.

The active reflected wave detector 206 being a radar sensor is advantageous over other reflected wave technologies in that radar signals can transmit through some materials, e.g. wood or plastic, but not others—notably water which is important because humans are mostly water. This means that the radar can potentially "see" a person in the environment 100 even if they are behind such an object, this is not the case for a sonar sensor.

In some embodiments, the CPU 202 is configured to detect activity in the monitored space 104 based on an output of the activity sensor 204. The activity sensor 204 may comprise a motion sensor such as a passive infrared (PIR) sensor. The output from the PIR sensor may be analysed in the CPU to detect motion, or the activity sensor 204 may itself be the motion detector. The motion detector is preferably a PIR detector, however it could be an active reflected wave sensor, for example radar, that detects motion based on the Doppler effect. That is, the activity sensor 204 may be a radar based motion detector which detects motion based on the Doppler component of a radar signal. The activity sensor 204 is not limited to being a motion detector, and in some embodiments may detect activity in the monitored space 104 by way of vibration detection or sound detection.

Each of the activity sensor 204 and the active reflected wave detector 206 has a field of view. The activity sensor 204 and the active reflected wave detector 206 may be arranged such that their fields of view overlap. The fields of view of the activity sensor 204 and the active reflected wave detector 206 may partially or fully overlap.

The overlapping, or partial overlapping, of the fields of view is, in some embodiments, in the 3D sense. However in other embodiments the overlapping, or partial overlapping, of the fields of view may be in a 2D, plan view, sense. For example there may be an overlapping field of view in the X and Y axes, but with a non-overlap in the Z axis. Thus there is at least a partial overlap between the fields of view of the activity sensor 204 and the active reflected wave detector 206.

In embodiments whereby the activity sensor 204 is a motion detector, the motion detector 204 may have a vertical field of view limited to heights above a predefined height threshold (e.g. 70 cm) above the floor level, so as to avoid triggering by pets. In these embodiments, the active reflected wave detector 206 on the other hand would have a field of view that includes heights below this height threshold, e.g. between the threshold and the floor level, to be able to detect the person when they are close to the floor—which is a situation that means they may have fallen. In some embodiments the field of view of the active reflected wave detector 206 also includes heights above the height threshold so as to assist in any reflected-wave measurements of the person when the person is standing. In embodiments, the active reflected wave detector 206 is used to determine whether the person is in a posture that may be relate to them having fallen. This may be achieved for example by detecting a height associated with a certain location on their body, e.g. a location above their legs.

In operation, the active reflected wave detector 206 performs one or more reflected wave measurements at a given moment of time, and over time these reflected wave measurements can be correlated by the CPU 202 with the presence of a person and/or a state of the person and/or a condition of the person. In the context of the present disclosure, the state of the person may be a characterization of the person based on a momentary assessment. For example, a classification passed on their position (e.g. in a location in respect to the floor and in a configuration which are consistent or inconsistent with having fallen) and/or their kinematics (e.g. whether they have a velocity that is consistent or inconsistent with them having fallen, or having fallen possibly being immobile). In the context of the present disclosure, the condition of the person may comprise a determination of an aspect of the person's health or physical predicament, for example whether they are in a fall condition whereby they have fallen and are substantially immobile, such that they may not be able (physically and/or emotionally) to get to a phone to call for help. In some embodiments this involves an assessment of the person's status over time, such as in the order or 30-60 seconds. However, the condition of the person may in some contexts be synonymous with the status of the person. For example, by determining that the person is in a safe supported state or a standing state, it may be concluded that the person is not currently in a fall condition, whereby they are on the floor and potentially unable to seek help. It may additionally or alternatively be concluded that they are in a resting condition because of their status being determined to be in a safe supported state, e.g. lying on a bed. In another example their condition may be classified as active and/or mobile based on a determination of a walking status.

Figures 3A, 3B:
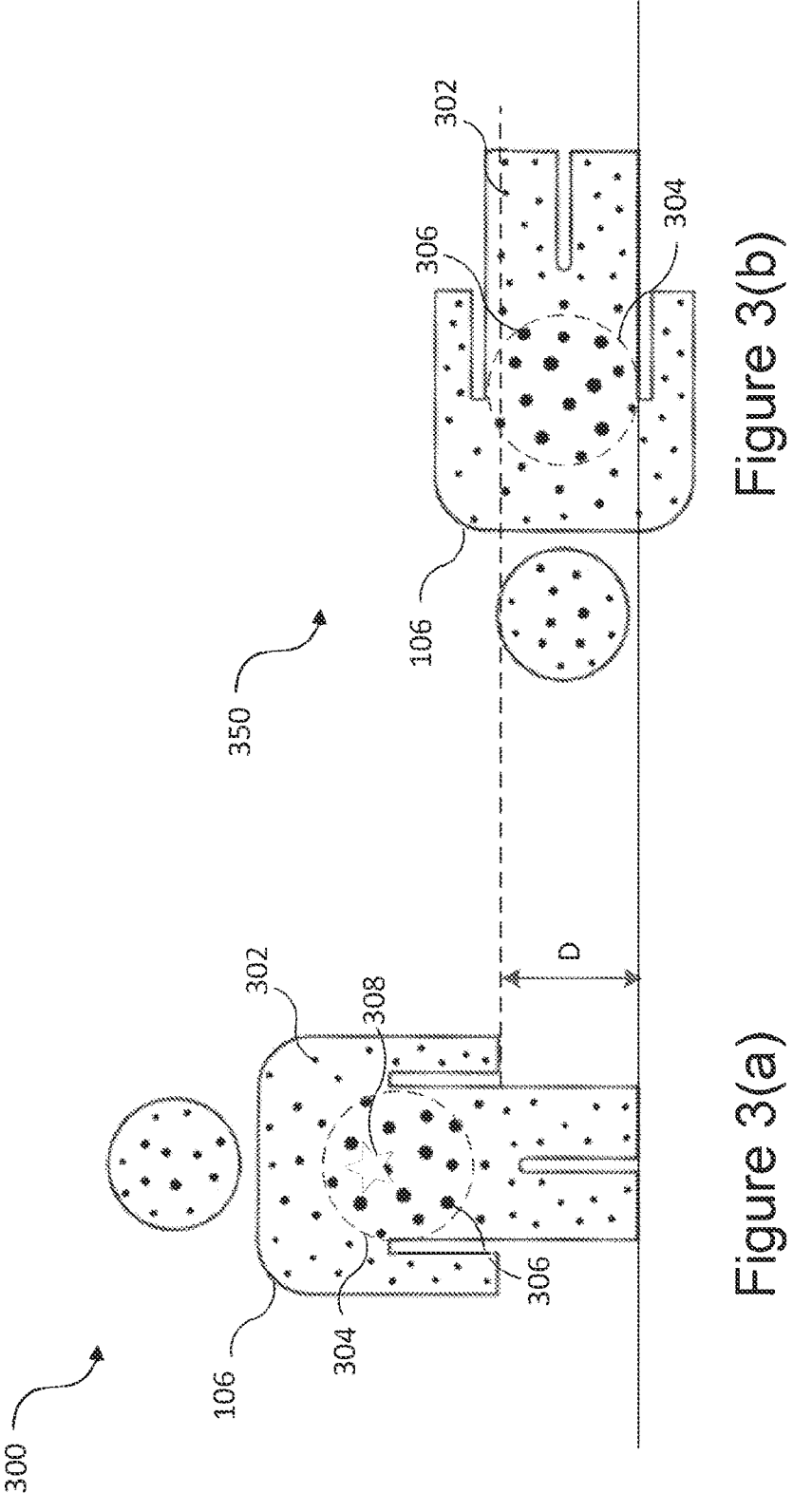
FIGS. 3a and 3b illustrate a human body with indications of reflections measured by a reflective wave detector when the person is in a standing non-fall state and in a fall state.

FIG. 3*a* illustrates a free-standing human body 106 with indications of reflective wave reflections therefrom in accordance with embodiments.

For each reflected wave measurement, for a specific time in a series of time-spaced reflective wave measurements, the reflective wave measurement may include a set of one or more measurement points that make up a "point cloud". Each point 302 in the point cloud may be defined by a 3-dimensional spatial position from which a reflection was received, and defining a peak reflection value, and a doppler value from that spatial position. Thus, a measurement received from a reflective object may be defined by a single point, or a cluster of points from different positions on the object, depending on its size. In some embodiments the point cloud is prefiltered to exclude points for which a doppler value is below a threshold.

FIG. 3*a* illustrates a map of reflections. The size of the point represents the intensity (magnitude) of energy level of the radar reflections (see larger point 306). Different parts or portions of the body reflect the emitted signal (e.g. radar) differently. For example, generally, reflections from areas of the torso 304 are stronger than reflections from the limbs. Each point represents coordinates within a bounding shape for each portion of the body. Each portion can be separately considered and have separate boundaries, e.g. the torso and the head may be designated as different portions. The point cloud can be used as the basis for a calculation of a reference parameter or set of parameters which can be stored instead of or in conjunction with the point cloud data for a reference object (human) for comparison with a parameter or set of parameters derived or calculated from a point cloud for radar detections from an object (human).

When a cluster of measurement points are received from an object in the environment 100, a location of a particular part/point on the object or a portion of the object, e.g. its centre, may be determined by the CPU 202 from the cluster of measurement point positions having regard to the intensity or magnitude of the reflections (e.g. a centre location comprising an average of the locations of the reflections weighted by their intensity or magnitude). As illustrated in FIG. 3*a*, the reference body has a point cloud from which its centre has been calculated and represented by the location 308, represented by the star shape. In this embodiment, the torso 304 of the body is separately identified from the body and the centre of that portion of the body is indicated. In alternative embodiments, the body can be treated as a whole or a centre can be determined for each of more than one body part e.g. the torso and the head, for separate comparisons with centres of corresponding portions of a scanned body.

In one or more embodiments, the object's centre or portion's centre is in some embodiments a weighted centre of the measurement points. The locations may be weighted according to an Radar Cross Section (RCS) estimate of each measurement point, where for each measurement point the RCS estimate may be calculated as a constant (which may be determined empirically for the reflected wave detector 206) multiplied by the signal to noise ratio for the measurement divided by $R^4$, where R is the distance from the reflected wave detector 206 antenna configuration to the position corresponding to the measurement point. In other embodiments, the RCS may be calculated as a constant multiplied by the signal for the measurement divided by $R^4$. This may be the case, for example, if the noise is constant or may be treated as though it were constant. Regardless, the received radar reflections in the exemplary embodiments described herein may be considered as an intensity value, such as an absolute value of the amplitude of a received radar signal.

In any case, the weighted centre, WC, of the measurement points for an object may be calculated for each dimension as:

$$WC = \frac{1}{\sum_{n=1}^{N} W_n} \sum_{n=1}^{N} (W_n P_n)$$

Where:

N is the number of measurement points for the object;

$W_n$ is the RCS estimate for the $n^{th}$ measurement point; and $P_n$ is the location (e.g. its coordinate) for the $n^{th}$ measurement point in that dimension.

In some embodiments, the CPU 202 is configured to process measured wave reflections from the environment that are measured by the active reflected wave detector 206 to detect whether a person is in the environment and, if a person is detected, classify a state of the person in the environment.

As will be described in more detail below, this need not be a two-step process i.e. of looking for a person and then classifying them. For example, the CPU 202 may take the output of the active reflected wave detector 206 and do a classification, wherein one of the outputs of the classification is that there is no person, or in other embodiments it may only conclude that there is no person if it fails to perform a classification of a person's status.

The classification performed by the CPU 202 may classify the person as being in a safe supported state which indicates that they are in a reclined supported state e.g. in an elevated lying down position (e.g. laying on a bed) or in a sitting position; or a standing supported state (e.g. the person is standing and leaning on a wall or is standing with the help of certain walking or standing aids, for example a walking frame). As described in more detail below, the classification performed by the CPU 202 may provide further detail on the person's safe supported state. In particular the classification performed by the CPU 202 may classify the person as being in a non-standing safe supported state (i.e. a reclined supported state) or a standing safe supported state, or a specific safe supported state.

The classification performed by the CPU 202 may classify the person as being in a crawling state, which may be regarded as a fall position/condition or a non-fall position/condition (given that if the person has fallen the person is still able to move so may be regarded as less critical) dependent on how the CPU 202 is configured.

The classification performed by the CPU 202 may classify the person as being in a fall state (indicative that they have fallen). In embodiments of the present disclosure the determination that the person is in a fall position is used as an indicator that the person may have fallen. Though the fall position may be also occur as a result of other circumstances in which they are lying or approximately lying on the floor. The fall position may thus be considered position that is consistent with having fallen. However, if the person is identified as remaining in the fall position for long enough, e.g. more than a threshold period of time, it may be determined that the person is reasonably likely to be in need of help, and a notification may be issued accordingly to a remote device.

The classification performed by the CPU 202 may classify the person as being in free-standing state (e.g. they are walking).

The classification may be performed by the CPU 202 by looking at a set of sequential frames over a period of time and classifying the state of the person based on the set of sequential frames. For example, the CPU 202 may classify the person as being in a fall position based on the person's fall/non-fall positions for the respective frames. Multiple frames (e.g. 10 frames) may be used to determine whether there are more fall or non-fall results to improve the accuracy of the determination (the result which occurs more is the selected result).

Using Thresholds

In some embodiments, in order to detect and classify the state of a person the CPU 202 processes the measured wave reflections by determining one or more parameters associated with the measured wave reflections and then comparing the parameter(s) to one or more thresholds to detect and classify the state of a person.

The person may be tracked using a tracking module in the CPU 202. The tracking module can use any known tracking algorithm. For example, the active reflected wave detector 206 may generate a plurality of detection measurements (e.g. up to 100 measurements, or in other embodiments hundreds of measurements) for a given frame. Each measurement can be taken a defined time interval apart such as 0.5, 1, 2 or 5 seconds apart. Each detection measurement may include a plurality of parameters in response to a received reflective wave signal above a given threshold. The parameters for each measurement may for example include an x and y coordinate (and z coordinate for a 3D active reflected wave detector 206), a peak reflection value, and a doppler value corresponding to the source of the received radar signal.

The data can then be processed using a clustering algorithm to group the measurements into one or more measurement clusters corresponding to a respective one or more targets. An association block may then associate a given cluster with a given previously measured target. A Kalman filter of the tracking module may then be used to determine the next position of the target based on the corresponding cluster of measurements and the prediction of the next position based on the previous position and other information e.g. the previous velocity.

From the reflected wave measurements an RCS of an object represented by a cluster of measurement points can be estimated by summing the RCS estimates of the each of the measurement points in the cluster. This RCS estimate may be used to classify the target as a human target if the RCS is within a particular range potentially relevant to humans for the frequency of the signal emitted by the active reflected wave detector 206, as the RCS of a target is frequency dependent. Taking a 77 GHz radar signal as an example, from empirical measurements, the RCS (which is frequency dependent) of an average human may be taken to be in the order of 0.5 m$^2$, or more specifically in a range between 0.1 and 0.7 m$^2$, with the value in this range for a specific person depending on the person and their orientation with respect to the radar. The RCS of human in the 57-64 GHz spectrum is similar to the 77 GHz RCS—i.e. 0.1 and 0.7 m$^2$.

The tracking module may output values of location, velocity and/or RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g. cartesian or polar dimensions), depending on the embodiment.

The Kalman filter tracks a target object between frames and therefore multiple frames of reflection measurement data can be used to determine a person's velocity. Three or more frames (e.g. 3-5 frames) may be required in order to determine that there is movement exceeding a movement threshold. The frames may be taken at a rate of 2 Hz, for example.

In order to classify the state of the person in the environment, the CPU 202 may determine a height metric associated with at least one measurement of a reflection from the person conveyed in the output of the active reflected wave detector 206 and compare the height metric to at least one threshold.

The height metric may be a height of a weighted centre of the measurement points of a body or part thereof (where each measurement is weighted by the RCS estimation), and the CPU 202 may compare this height metric to a threshold distance, D, from the floor (e.g. 30 cm) and determine that the person in the environment is in a standing (non-fall) position if the height metric exceeds the threshold distance, this is illustrated in FIG. 3*a*.

The height metric used to classify the state of the person is not limited to being a height of a weighted centre of the measurement points of the person's body or part thereof. In another example, the height metric may be a maximum height of all of the height measurements associated with the person's body or part thereof. In another example, the height metric may be an average height (e.g. median z value) of all of the height measurements of the person's body or part thereof. In the case of using a weighted centre or average height, the "part thereof" may beneficially be a part of the body that is above the person's legs to more confidently distinguish between fall and non-fall positions.

If the height metric is within (less than) the threshold distance, D, from the floor (e.g. 30 cm), the CPU 202 may determine that the person in the environment is in a fall position, this is illustrated in FIG. 3*b*. If the height metric is greater than a first threshold distance from the floor but less than a second threshold distance from the floor (for example a maximum height amongst the measurements associated with body is between 30 cm and 1.3 m), the CPU 202 may be able to detect that the person is in a safe reclined position whereby they are likely to be safely resting for example a state in which they are in an elevated lying down position (e.g. lying down on a bed), or in some embodiments this may additionally encompass being in a sitting position on an item of furniture).

In order to classify the state of the person in the environment, the CPU 202 may determine a velocity associated with the person using the measurements of reflections that are conveyed in the output of the active reflected wave detector 206 and compare the velocity to a velocity threshold. The tracking module referred to above may output a value of velocity for the target (person in the environment). The comparison between the detected velocity associated with the person and the velocity threshold can assist with narrowing the classification down to a specific state. For example if the detected velocity associated with the person is greater than the velocity threshold the CPU 202 can determine that the person is moving and is in either a crawling state or standing ambulatory state (e.g. they are walking). If the detected velocity associated with the person is not greater than the velocity threshold the CPU 202 may determine that the person is not moving and is either in a fall state or are in a reclined (non-standing) supported state (e.g. they are in an elevated lying down position or in a sitting position) or standing still. As will be explained in more detail below, in some embodiments the classification performed by the CPU 202 may use a plurality of velocity magnitude measurements of the person corresponding to different times, each of these velocity magnitude measurements determined using the reflections associated with the person conveyed in the output of the active reflected wave detector.

Further if for a defined duration of time, a standard deviation of the velocity is below a predefined threshold it may be concluded that a person that is standing still is supported, e.g. leaning on a wall; or if above the threshold, that they are free-standing. In other embodiments the value of the velocity threshold alone or in combination with the standard deviation may be used to distinguish a free-standing state from a supported state.

In order to classify the state of the person in the environment, the CPU 202 may determine a spatial distribution of the measurements of reflections that are conveyed in the output of the active reflected wave detector 206 and compare the spatial distribution to a threshold. This may include determining a horizontal spatial distribution of the measurements of reflections that are conveyed in the output of the active reflected wave detector 206 and comparing the horizontal spatial distribution to a horizontal spatial distribution threshold. Alternatively or additionally, this may include determining a vertical spatial distribution of the measurements of reflections that are conveyed in the output of the active reflected wave detector 206 and comparing the vertical spatial distribution to a vertical spatial distribution threshold.

The comparison between the spatial distribution(s) to a threshold can assist with narrowing the classification down to a specific state. For example, if the vertical spatial distribution is greater than the vertical spatial distribution threshold (high z variance) and the horizontal spatial distribution is less than the horizontal spatial distribution threshold (low x-y plane variance), then the CPU 202 can determine that the person is in a free-standing ambulation state (e.g. they are walking) or in a safe supported state (e.g. they are standing and leaning on a wall). In another example, if the vertical spatial distribution is less than the vertical spatial distribution threshold (low z variance) and the horizontal spatial distribution is greater than the horizontal spatial distribution threshold (high x-y plane variance), then the CPU 202 can determine that the person is in a fall state or in a safe supported state (e.g. they are in an elevated lying down position). Alternatively the ratio of the horizontal spatial distribution to vertical spatial distribution may be compared with a threshold. Such a ratio being below a threshold that has a value less than 1 may be taken to indicate that the person is in a standing state. Such a ratio being above a threshold that has a value greater than 1 may be taken to indicate that the person is in a fall state or in an elevated lying down position, and hence in a safe supported state.

Using a Classifier Model

In other embodiments, in order to detect and classify the state of a person, rather than the CPU 202 determining one or more parameters associated with the measured wave reflections and then comparing the parameter(s) to one or more thresholds, the CPU 202 may supply the determined parameters as inputs into a trained classifier module running on the CPU 202.

The trained classifier module may be trained using one or more training data sets which includes reflective wave measurements and a corresponding definition of which output state the reflective wave measurements correspond to.

The received parameters may include one or more of: (i) a height metric associated with at least one reflection; (ii) a velocity associated with the person using the measurements of reflections; and (iii) a spatial distribution characterization of the measurements (e.g. one or more of a horizontal spatial distribution (e.g. a variance or equivalently a standard deviation), a vertical spatial distribution and a ratio therebetween. Additionally, RCS estimates may be used to aid in assessing whether the object being classified is in fact a human. Analysis of the wave reflections to determine whether the object is likely to be human may be performed before or after the classification, but in other embodiments it may be performed as part of the classification. Thus, the classifier may additionally receive the following parameters: (iv) a sum of RCS estimates, and in some embodiments (v) a distribution (e.g., variance or equivalently standard deviation) of RCS estimates. For example, the received parameters may be: 1. an average height (e.g. median z value); 2. a standard deviation of RCS estimates; 3. A sum of RCS estimates; and 4. a standard deviation of height(z) values.

In these embodiments the trained classifier module uses the received parameters and the training data set(s) to classify the state of the person in the environment. As will be explained in more detail below, in some embodiments the classification performed by the CPU 202 may use a plurality of velocity magnitude measurements of the person corresponding to different times, each of these velocity magnitude measurements determined using the reflections associated with the person conveyed in the output of the active reflected wave detector.

It will be appreciated that this can be implemented in various ways.

The trained classifier module may be used at operation time to determine a classification score, using a method known by the person skilled in the art. The score may for example provide an indication of a likelihood or level of confidence that the received parameters correspond to a particular classifier output state. A determination of a particular classification (e.g. a fall position) may for example be based on whether a classification confidence score is greater than a threshold then the person is determined to be in that state. For example, the CPU 202 may determine that the person is in a fall state if the output of the classifier determines that there is more than a 60% likelihood (or some other predefined likelihood threshold, which may optionally be greater than 50%, or even less than 50% to be conservative/cautious) of the person being in a fall position.

It will be appreciated that it may not be necessary for the classifier module to be trained with a data set associated with a particular classifier state in order for the classifier module to classify the person as being in the particular classifier state. Consider the simple example whereby the trained classifier module is configured to indicate that the person is in one of two states (i.e. in a fall state or a non-fall state), the trained classifier module may have been trained with a data set including reflective wave measurements corresponding to a person in a fall state, and based on a low correlation of the received parameters to the training data set corresponding to a person in a fall state, the trained classifier module may be configured to indicate that the person is in a non-fall state.

Furthermore, as noted above, there need not be a two-step process of looking for a person and then classifying them. A trained classifier module could be used that is trained of different data that is not necessarily limited to reflections from discreet objects or from objects already identified as potentially being human. For example a classifier could be fed respective sets of training data for (i) a person is present and in a fall position; (ii) a person is present and in a non-fall position; and (iii) no person is present. The classifier may determine a classification of active reflective wave measurements based on which of the trained states it is most closely correlated with.

Any other method, known by the person skilled in the art, of training and using the classifier based on (i) the receiving parameters as exemplified above, and (i) the relevant output states may alternatively be used.

I. Detecting a Safe Supported State

We now describe a first embodiment of the present disclosure which relates to classifying the person as being in a safe supported state which indicates that they are in a reclined supported state e.g. in an elevated lying down position (e.g. lying on a bed) or in a sitting position; or a standing supported state (e.g. the person is standing and leaning on a wall or is standing with the help of a certain walking or standing aid, for example a walking frame. By classifying the person as being in a safe supported state it can be determined that the person is not in need of help. Whilst some positions are referred to herein as examples of a person being in a safe supported state, it will be appreciated that embodiments extend to classifying the person as being in a safe supported state when the person is in other positions in the environment which are indicative that the person is supported by an object in the environment and is not in need of help.

A first method of classifying the person as being in a safe supported state is illustrated in the process 400 of FIG. 4.

It should be noted that when the process 400 is started, the active reflected wave detector 206 is in an activated state and operable to measure wave reflections from the environment. Optionally, the CPU 202 may have activated (e.g. turned on or controlled the active reflected wave detector 206 to be in a normal operating mode rather than a low power consumption operating mode) the active reflected wave detector 206 in response to determining that the activity sensor 204 started to detect activity (so the person entered the room), but thereafter detected no activity for a predetermined amount of time.

At step S402 the CPU 202 receives an output of the active reflected wave detector 206 which comprises measured wave reflections from the environment that are measured by the active reflected wave detector 206.

At step S404, the CPU 202 processes the measured wave reflections to determine a height metric associated with at least one reflection from the person conveyed in the output of the active reflected wave detector 206.

The height metric may be a height of a weighted centre of the measurement points of the body of the person or a part thereof (where each measurement is weighted by the RCS estimation). In another example, the height metric may be a maximum height of all of the height measurements associated with the person's body or part thereof (e.g. that is above the person's legs). In another example, the height metric may be an average height (e.g. median z value) of all of the height measurements of the person's body or part thereof.

At step S406, the CPU 202 processes the measured wave reflections associated with the person to determine a spatial distribution of the measurements of reflections associated with the person conveyed in the output of the active reflected wave detector.

At step S406, the CPU 202 may process the measured wave reflections to determine a horizontal spatial distribution of the measurements of the reflections associated with the person conveyed in the output of the active reflected wave detector. From the horizontal spatial distribution the CPU 202 may infer a vertical spatial distribution of the reflections (for example, if there is a very low horizontal variance it may be inferred that there is a higher vertical variance).

At step S406, the CPU 202 may process the measured wave reflections to determine a vertical spatial distribution of the measurements of the reflections associated with the person conveyed in the output of the active reflected wave detector. From the vertical spatial distribution the CPU 202 may infer a horizontal spatial distribution of the reflections (for example, if there is a very low vertical variance it may be inferred that there is a higher horizontal variance).

At step S406, the CPU 202 may process the measured wave reflections to determine both a horizontal spatial distribution and a vertical spatial distribution of the measurements of the reflections associated with the person conveyed in the output of the active reflected wave detector.

The process 400 then proceeds to step S408, where the CPU 202 classifies the state of the person detected in the environment as being in a safe-supported state based on the height metric determined at step S404 and the spatial distribution of the reflections determined at step S406.

At step S408 in order to detect and classify the state of a person as being in a safe-supported state the CPU 202 may compare the height metric to a predetermined height threshold, and compare the spatial distribution of the measurements of the reflections to a predetermined distribution threshold.

For example, if the vertical spatial distribution is below the distribution threshold (i.e. if the z variance is small) and the height metric is above the predetermined height threshold (i.e. they are not on the floor) it can be concluded the person is lying down on a bed or couch and therefore in a safe supported state.

At step S408 in order to detect and classify the state of a person as being in a safe-supported state the CPU 202 may supply the determined height metric and spatial distribution of the reflections as inputs into a trained classifier module running on the CPU 202.

Figure 5:
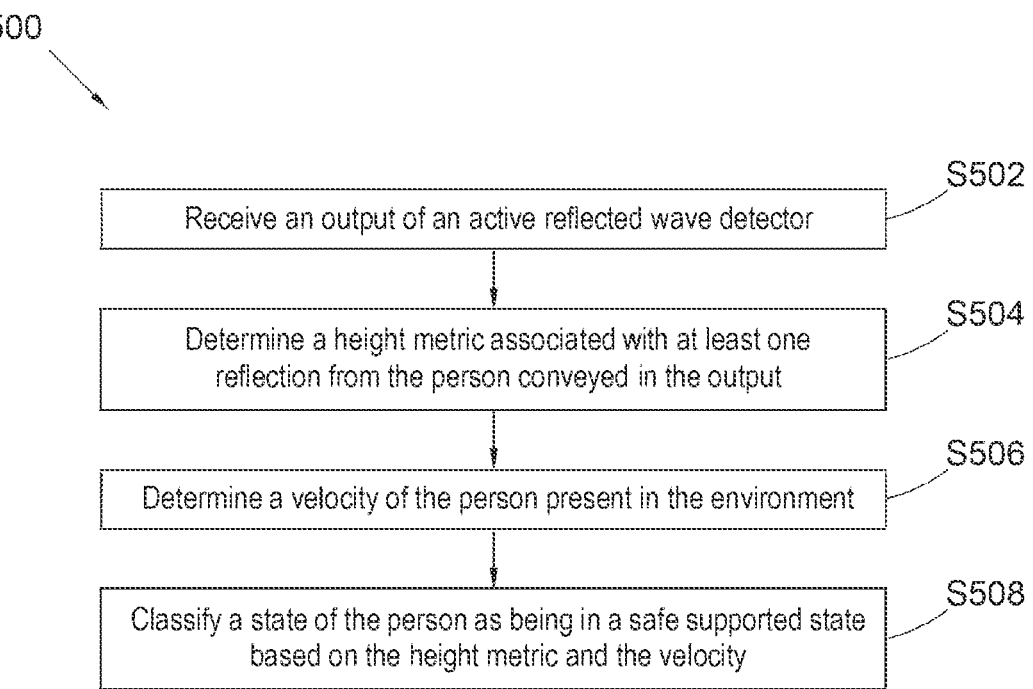
FIG. 5 illustrates a process for a second method of determining that a person is in a safe supported state.

A second method of classifying the person as being in a safe supported state is illustrated in the process 500 of FIG. 5.

It should be noted that when the process 500 is started, the active reflected wave detector 206 is in an activated state and operable to measure wave reflections from the environment. Optionally, the CPU 202 may have activated (e.g. turned on or controlled the active reflected wave detector 206 to be in a normal operating mode rather than a low power consumption operating mode) the active reflected wave detector 206 in response to determining that the activity sensor 204 started to detect activity (so the person entered the room), but thereafter detected no activity for a predetermined amount of time.

Steps S502 and S504 correspond to steps S402 and S404 shown in FIG. 4 and described above.

At step S506, the CPU 202 determines a velocity of the person present in the environment using the measurements of reflections that are conveyed in the output of the active reflected wave detector 206.

At step S506, a tracking module of the CPU 202 may track the person (a target object) between frames using multiple temporally spaced frames of reflection measurement data to determine whether there is movement of the person that exceeds a movement threshold. In each frame a weighted center of the reflection measurements for that frame is calculated, and movement of the weighted centers from respective frames is used by the Kalman filter to estimate velocity.

The process 500 then proceeds to step S508, where the CPU 202 classifies the state of the person detected in the environment as being in a safe-supported state based on the height metric determined at step S504 and the velocity determined at step S506.

At step S508 in order to detect and classify the state of a person as being in a safe-supported state the CPU 202 may compare the height metric to a predetermined height threshold, and compare the velocity to a predetermined velocity threshold.

For example, if the height is above the predetermined height threshold (and thus it can be concluded that they are not on the floor and in a fall state), and the person's velocity is below the predetermined velocity threshold it can be concluded the person is in a safe supported state. This is based on the observation that a person in a safe supported state will have a lower velocity than if they were in a free standing state and the predetermined velocity threshold can be set accordingly to distinguish between these states.

At step S508 in order to detect and classify the state of a person as being in a safe-supported state the CPU 202 may supply the determined height metric and velocity as inputs into a trained classifier module running on the CPU 202.

At steps S408 and S508, the trained classifier module may be used at operation time to determine a likelihood (e.g. a classification confidence score) that the received parameters correspond to a training data set associated with a person being in a safe supported state, and if the classification confidence score is greater than a threshold then the person is determined to be in that state. For example, the CPU 202 may determine that the person is in a safe supported state if the output of the classifier determines that there is more than a 60% likelihood (or some other predefined likelihood threshold, which may optionally be greater than 50%, to be conservative in not misclassifying a fall state as a non-fall state) of the person being in a safe supported state.

Whilst the trained classifier module may have been trained with a training data set generally associated with a person being in a safe supported state, in other examples the trained classifier module may have been trained with multiple training data sets, each training data set including reflective wave measurements corresponding to a person being in a specific safe supported state.

In one embodiment the trained classifier module is trained with multiple training data sets so as to be able to make a distinction between the person being in a reclined (non-standing) safe supported state or a standing safe supported state e.g. the trained classifier module is trained with a training data set associated with a reclined (non-standing) safe supported state and a training data set associated with a standing safe supported state). In this embodiment rather than having a training data set generally associated with a person being in a reclined (non-standing) safe supported state the trained classifier module may have been trained with training data sets that relate to specific reclined (non-standing) safe supported states (e.g. a training data set associated with a lying down state, and a training data set associated with a sitting state).

In another embodiment the trained classifier module is trained with multiple training data sets so as to identify that the person is in a specific reclined (non-standing) safe supported state to provide further information relating to the person's safe supported state e.g. the trained classifier module is trained with a training data set associated with a lying down state, and a training data set associated with a sitting state. In this embodiment, the trained classifier module may not be configured to identify a standing safe supported state (i.e. is not trained with a training data set associated with a standing safe supported state).

The trained classifier module may determine that the person is in one of the specific safe supported states if the output of the classifier determines that the classification confidence score associated with the specific safe supported state is more than a predefined threshold. In this example, the trained classifier module may be configured to provide an "other" characterization if the classifier gives a low confidence for the person being in one of the specific safe supported states (for example if the person is crouching, leaning over). The "other" state may be treated in a similar way to the free-standing state, but in other embodiments the "other" state may be treated differently.

In both the first and second methods once the CPU 202 has determined that the person is in a safe supported state the CPU 202 may control transmission of a notification that the person is in a safe supported state or a specific safe supported state. That is, the notification may specify that the person is in a standing supported state or a reclined supported state. If it is determined that the person is in a reclined supported state the notification may specify that the person is in a sitting position or in an elevated lying down position.

The issuance of the notification may be performed in various ways. For example the CPU 202 may transmit an alert message to a remote device (not shown in FIG. 1) via a wired or wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control panel in the environment 100 (e.g. a wall mounted control panel).

The classification performed at step S508 may additionally be based on a spatial distribution of the measurements of reflections associated with the person conveyed in the output of the active reflected wave detector.

That is, the CPU 202 may process the measured wave reflections to determine a horizontal spatial distribution and/or vertical spatial distribution of the measurements of the reflections associated with the person conveyed in the output of the active reflected wave detector.

Similar to the first method illustrated in FIG. 4, the CPU 202 may compare the spatial distribution of the measurements of the reflections to a predetermined distribution threshold as part of the classification performed at step S508. For example, the CPU 202 may compare the vertical spatial distribution to a distribution threshold to determine a specific safe supported state (e.g. a lying down state, a sitting state, and a standing supported state).

Alternatively, the spatial distribution of the measurements of the reflections may be used as an additional parameter that is fed as an input into the trained classifier module running on the CPU 202.

II. Detecting a Crawling State

Figure 6:
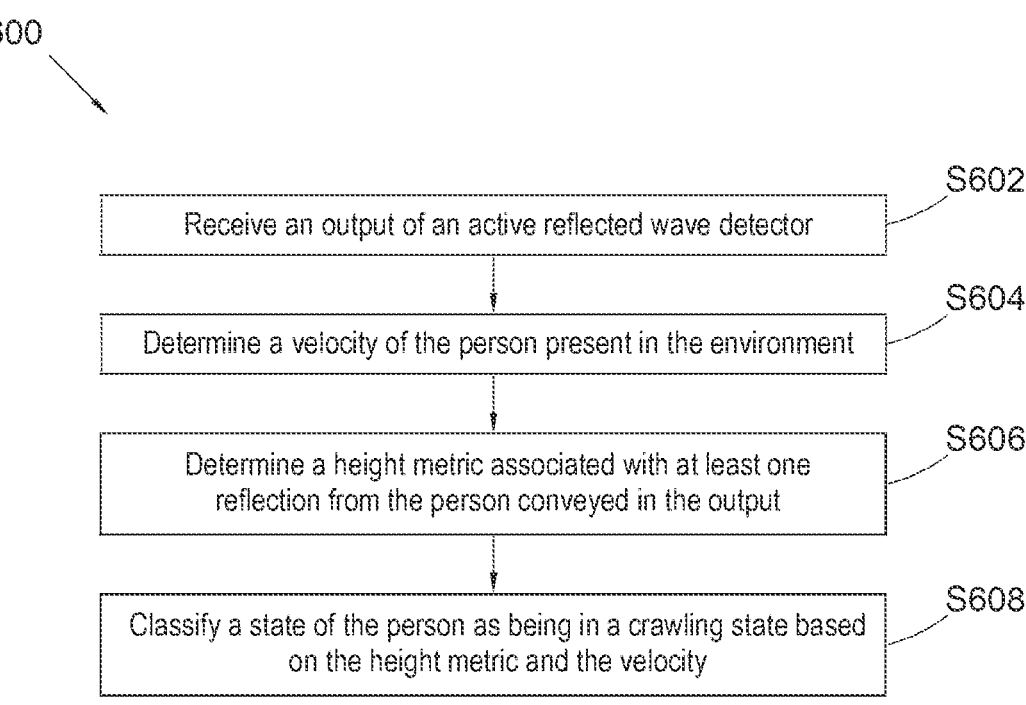
FIG. 6 illustrates a process for determining that a person is in a crawling state.

We now describe a second embodiment of the present disclosure which relates to classifying the person as being in a crawling state with reference to the process 600 illustrated in FIG. 6.

It should be noted that when the process 600 is started, the active reflected wave detector 206 is in an activated state and operable to measure wave reflections from the environment. Optionally, the CPU 202 may have activated (e.g. turned on or controlled the active reflected wave detector 206 to be in a normal operating mode rather than a low power consumption operating mode) the active reflected wave detector 206 in response to determining that the activity sensor 204 started to detect activity (so the person entered the room), but thereafter detected no activity for a predetermined amount of time.

At step S602 the CPU 202 receives an output of the active reflected wave detector 206 which comprises measured wave reflections from the environment that are measured by the active reflected wave detector 206.

At step S604, the CPU 202 determines a velocity of the person present in the environment using the measurements of reflections that are conveyed in the output of the active reflected wave detector 206.

At step S604, a tracking module of the CPU 202 may track the person (a target object) between frames use multiple frames of reflection measurement data to determine whether there is movement of the person that exceeds a movement threshold. In each frame a weighted center of the reflection measurements for that frame is calculated, and movement of the weighted centers from respective frames is used by the Kalman filter to estimate velocity.

At step S606, the CPU 202 processes the measured wave reflections to determine a height metric associated with at least one reflection from the person conveyed in the output of the active reflected wave detector 206.

The height metric may be a height of a weighted centre of the measurement points of the body of the person or a part thereof (where each measurement is weighted by the RCS estimation). In another example, the height metric may be a maximum height of all of the height measurements associated with the person's body or part thereof (e.g. that is above the person's legs). In another example, the height metric may be an average height (e.g. median z value) of all of the height measurements of the person's body or part thereof.

The process 600 then proceeds to step S608, where the CPU 202 classifies the state of the person detected in the environment as being in a crawling state based on the magnitude of the velocity determined at step S604 and the height metric determined at step S606.

At step S608 in order to detect and classify the state of a person as being in a crawling state the CPU 202 may compare the velocity magnitude to a predetermined velocity threshold, and compare the height metric to a predetermined height threshold.

For example, if the velocity magnitude is determined to be above the predetermined velocity threshold and the height metric is below the predetermined height threshold it can be concluded the person is in a crawling state. If the height metric is below the predetermined height threshold this indicates that the person is not in an up-right standing position.

At step S608 in order to detect and classify the state of a person as being in a crawling state the CPU 202 may supply the determined velocity and the height metric into a trained classifier module running on the CPU 202.

At step S608, the trained classifier module may be used at operation time to determine a likelihood (e.g. a classification confidence score) that the received parameters correspond to a training data set associated with a person being in a crawling state, and if the classification confidence score is greater than a threshold then the person is determined to be in that state. For example, the CPU 202 may determine that the person is in a crawling state if the output of the classifier determines that there is more than a 60% likelihood of the person being in a crawling state. Alternatively some other predefined likelihood threshold may be used, which may optionally be less than 50%, to be conservative. This is because a crawl state may be considered a sub-category of a fall state in some embodiments, since a person remaining, even if crawling, may be as a result of a fall and it may be considered that even if crawling a fall notification should be issued. However, as used in the examples herein a "fall state" is by default excluding the case of a crawl state. This is because if the person is crawling they are at least mobile, and therefore potentially able to actively seek assistance if needed.

Once the CPU 202 has determined that the person is in a crawling state the CPU 202 may control transmission of a notification that the person is in a crawling state.

The issuance of the notification may be performed in various ways. For example the CPU 202 may transmit an alert message to a remote device (not shown in FIG. 1) via a wired or wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control panel in the environment 100 (e.g. a wall mounted control panel).

The classification performed at step S608 may additionally be based on a spatial distribution of the measurements of reflections associated with the person conveyed in the output of the active reflected wave detector. That is, the CPU 202 may process the measured wave reflections to determine a horizontal spatial distribution and/or vertical spatial distribution of the measurements of the reflections associated with the person conveyed in the output of the active reflected wave detector.

The CPU 202 may compare the spatial distribution of the measurements of the reflections to a predetermined distribution threshold as part of the classification performed at step S608. For example, the CPU 202 may compare the horizontal spatial distribution to a distribution threshold to determine that the person is in the crawling state if the horizontal spatial distribution is below a predetermined distribution threshold. In another example, the CPU 202 may compare the vertical spatial distribution to a distribution threshold to determine that the person is in the crawling state if the vertical spatial distribution is above a predetermined distribution threshold. This is based on the idea that when the person is determined to to be particularly flat they are less likely to be crawling, at least not on their hands and knees, and if they are sliding on the floor they'd be moving very slowly. In another example, the CPU 202 may compare the vertical spatial distribution of the measurements of the reflections relative to the horizontal spatial distribution of the measurements of the reflections to classify the person as being in a crawling state.

Alternatively, the horizontal spatial distribution and/or vertical spatial distribution of the measurements of the reflections associated with the person may be used as an additional parameter that is fed as an input into the trained classifier module running on the CPU 202.

III. Detecting a Fall State

Figure 7:
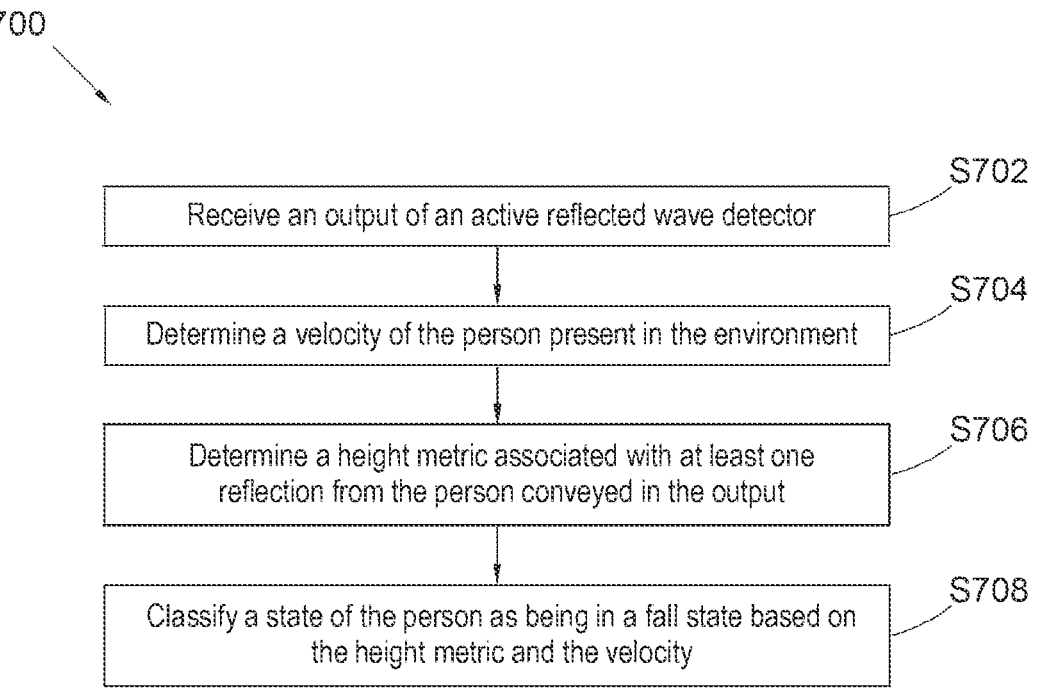
FIG. 7 illustrates a process for determining that a person is in a fall state.

We now describe a third embodiment of the present disclosure which relates to classifying the person as being in a fall state with reference to the process 700 illustrated in FIG. 7.

It should be noted that when the process 700 is started, the active reflected wave detector 206 is in an activated state and operable to measure wave reflections from the environment. Optionally, the CPU 202 may have activated (e.g. turned on or controlled the active reflected wave detector 206 to be in a normal operating mode rather than a low power consumption operating mode) the active reflected wave detector 206 in response to determining that the activity sensor 204 started to detect activity (so the person entered the room), but thereafter detected no activity for a predetermined amount of time.

At step S702 the CPU 202 receives an output of the active reflected wave detector 206 which comprises measured wave reflections from the environment that are measured by the active reflected wave detector 206.

At step S704, the CPU 202 determines a velocity of the person present in the environment using the measurements of reflections that are conveyed in the output of the active reflected wave detector 206.

At step S704, a tracking module of the CPU 202 may track the person (a target object) between frames use multiple frames of reflection measurement data to determine whether there is movement of the person that exceeds a movement threshold. In each frame a weighted center of the reflection measurements for that frame is calculated, and movement of the weighted centers from respective frames is used by the Kalman filter to estimate velocity.

At step S706, the CPU 202 processes the measured wave reflections to determine a height metric associated with at least one reflection from the person conveyed in the output of the active reflected wave detector 206.

The height metric may be a height of a weighted centre of the measurement points of the body of the person or a part thereof (where each measurement is weighted by the RCS estimation). In another example, the height metric may be a maximum height of all of the height measurements associated with the person's body or part thereof (e.g. that is above the person's legs). In another example, the height metric may be an average height (e.g. median z value) of all of the height measurements of the person's body or part thereof.

The process 700 then proceeds to step S708, where the CPU 202 classifies the state of the person detected in the environment as being in a fall state (i.e. identify that the person has fallen) based on the magnitude of the velocity determined at step S704 and the height metric determined at step S706.

At step S708 in order to detect and classify the state of a person as being in a fall state the CPU 202 may compare the velocity magnitude to a predetermined velocity threshold, and compare the height metric to a predetermined height threshold.

For example, if the velocity magnitude is determined to be below the predetermined velocity threshold and the height metric is below the predetermined height threshold it can be concluded the person is in a fall state.

At step S708 in order to detect and classify the state of a person as being in a fall state the CPU 202 may supply the determined velocity magnitude and the height metric into a trained classifier module running on the CPU 202.

At step S708, the trained classifier module may be used at operation time to determine a likelihood (e.g. a classification confidence score) that the received parameters correspond to a training data set associated with a person being in a fall state, and if the classification confidence score is greater than a threshold then the person is determined to be in that state. For example, the CPU 202 may determine that the person is in a fall state if the output of the classifier determines that there is more than a 60% likelihood (or some other predefined likelihood threshold, which may optionally be greater than 50% to minimize the number of false fall alarms, or potentially marginally less than 50% to be conservative/cautious) of the person being in a fall state.

Once the CPU 202 has determined that the person is in a fall state the CPU 202 may control transmission of a notification that the person is in a fall state.

The issuance of the notification may be performed in various ways. For example the CPU 202 may transmit an alert message to a remote device (not shown in FIG. 1) via a wired or wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control hub in the environment 100 (e.g. a wall or table mounted control panel). The control hub may be a control hub of a system that may be monitoring system and/or may be a home automation system. The notification to the control hub is in some embodiments via wireless personal area network, e.g. a low-rate wireless personal area network. Alternatively or additionally the CPU 202 may control a visual output device (e.g. a light) on device 102 to output a visual alert of the fall detection. Alternatively or additionally the CPU 202 may control an audible output device (e.g. a speaker) on device 102 to output an audible alert of the fall detection.

Being in a position which is consistent with the person having fallen does not necessarily mean they have fallen, or have fallen such that they need help. For example, they may be on the floor for other reasons, or they may have had a minor fall from which they can quickly recover. Thus in some embodiments, if the person remains in a fall position for sufficient time it may be concluded that they are sufficiently likely to have fallen to be classified as being in a fall condition, and the device 102 may therefore take appropriate action accordingly, e.g. by sending a notification to a remote device.

The classification performed at step S708 may additionally be based on a spatial distribution of the measurements of reflections associated with the person conveyed in the output of the active reflected wave detector. That is, the CPU 202 may process the measured wave reflections to determine a horizontal spatial distribution and/or vertical spatial distribution of the measurements of the reflections associated with the person conveyed in the output of the active reflected wave detector.

The CPU 202 may compare the spatial distribution of the measurements of the reflections to a predetermined distribution threshold as part of the classification performed at step S708. For example, the CPU 202 may compare the horizontal spatial distribution to a distribution threshold to determine that the person is in the fall state if the horizontal spatial distribution is below a predetermined distribution threshold. In another example, the CPU 202 may compare the vertical spatial distribution to a distribution threshold to determine that the person is in the fall state if the vertical spatial distribution is above a predetermined distribution threshold. This is based on the idea that when the person is determined to to be particularly flat they are less likely to be fall, at least not on their hands and knees, and if they are sliding on the floor they'd be moving very slowly. In another example, the CPU 202 may compare the vertical spatial distribution of the measurements of the reflections relative to the horizontal spatial distribution of the measurements of the reflections to classify the person as being in a fall state.

Alternatively, the horizontal spatial distribution and/or vertical spatial distribution of the measurements of the reflections associated with the person may be used as an additional parameter that is fed as an input into the trained classifier module running on the CPU 202.

IV. Detecting a Free-Standing State

We now describe a fourth embodiment of the present disclosure which relates to classifying the person as being in a free-standing state with reference to the process 800 illustrated in FIG. 8. We refer to a person being in a free-standing state when they are standing, unsupported, at the same place in their environment.

It should be noted that when the process 800 is started, the active reflected wave detector 206 is in an activated state and operable to measure wave reflections from the environment. Optionally, the CPU 202 may have activated (e.g. turned on or controlled the active reflected wave detector 206 to be in a normal operating mode rather than a low power consumption operating mode) the active reflected wave detector 206 in response to determining that the activity sensor 204 started to detect activity (so the person entered the room), but thereafter detected no activity for a predetermined amount of time.

At step S802 the CPU 202 receives an output of the active reflected wave detector 206 which comprises measured wave reflections from the environment that are measured by the active reflected wave detector 206.

At step S804, the CPU 202 determines a velocity of the person present in the environment using the measurements of reflections that are conveyed in the output of the active reflected wave detector 206.

At step S804, a tracking module of the CPU 202 may track the person (a target object) between frames use multiple frames of reflection measurement data to determine whether there is movement of the person that exceeds a movement threshold. In each frame a weighted center of the reflection measurements for that frame is calculated, and movement of the weighted centers from respective frames is used by the Kalman filter to estimate velocity.

At step S806 the CPU 202 processes the measured wave reflections associated with the person to determine a spatial distribution of the measurements of reflections associated with the person conveyed in the output of the active reflected wave detector. The CPU 202 may process the measured wave reflections to determine a horizontal spatial distribution of the measurements of the reflections associated with the person conveyed in the output of the active reflected wave detector. From the horizontal spatial distribution the CPU 202 may infer a vertical spatial distribution of the reflections (for example, if there is a very low horizontal variance it may be inferred that there is a higher vertical variance). The CPU 202 may process the measured wave reflections to determine a vertical spatial distribution of the measurements of the reflections associated with the person conveyed in the output of the active reflected wave detector. From the vertical spatial distribution the CPU 202 may infer a horizontal spatial distribution of the reflections (for example, if there is a very low vertical variance it may be inferred that there is a higher horizontal variance). The CPU 202 may process the measured wave reflections to determine both a horizontal spatial distribution and a vertical spatial distribution of the measurements of the reflections associated with the person conveyed in the output of the active reflected wave detector. Additionally or alternatively, at step S806 the CPU 202 processes the measured wave reflections to determine a height metric associated with at least one reflection from the person conveyed in the output of the active reflected wave detector 206.

The height metric may be a height of a weighted centre of the measurement points of the body of the person or a part thereof (where each measurement is weighted by the RCS estimation). In another example, the height metric may be a maximum height of all of the height measurements associated with the person's body or part thereof (e.g. that is above the person's legs). In another example, the height metric may be an average height (e.g. median z value) of all of the height measurements of the person's body or part thereof.

The process 800 then proceeds to step S808, where the CPU 202 classifies the state of the person detected in the environment as being in a free-standing state based on the magnitude of the velocity determined at step S804 and at least one of: (i) the spatial distribution of the measurements of the reflections associated with the person conveyed in the output of the active reflected wave detector determined at step S806; and (ii) the height metric determined at step S806.

At step S808 in order to detect and classify the state of a person as being in a free-standing state the CPU 202 may compare the spatial distribution of the measurements of the reflections to a predetermined distribution threshold.

For example, if the velocity is determined to be between a first (lower) threshold and a second (upper) threshold (indicative that the person is not leaning against a wall, but they are also not walking), and the vertical spatial distribution of the measurements of the reflections is greater than a predetermined distribution threshold (indicative that they are standing), the CPU 202 may determine that the person is in a free-standing state. In another example, if the velocity is determined to be between a first threshold and a second threshold (indicative that the person is not leaning against a wall, but they are also not walking), and the horizontal spatial distribution of the measurements of the reflections is less than a predetermined distribution threshold (indicative that they are standing), the CPU 202 may determine that the person is in a free-standing state. In yet another example, if the velocity is determined to be between a first threshold and a second threshold (indicative that the person is not leaning against a wall, but they are also not walking), and the ratio of the vertical spatial distribution of the measurements of the reflections to the horizontal spatial distribution of the measurements of the reflections is above a threshold, the CPU 202 may determine that the person is in a free-standing state. The person skilled in the art will appreciate that the value of the first threshold can be set such that a velocity of a person greater than the first threshold would indicate that the person is not being supported by an object in the environment. The person skilled in the art will appreciate that the value of the second threshold can be set such that a velocity of a person greater than the second threshold would indicate that the person is moving (e.g. walking) across the environment. As will be appreciated the velocity parameter used for such velocity threshold comparisons is more specifically a velocity magnitude. As will also be appreciated, for embodiments herein in which the direction of the velocity is not used but its magnitude is used, the direction need not be measured.

Additionally or alternatively, at step S808 in order to detect and classify the state of a person as being in a free-standing state the CPU 202 may compare the velocity magnitude to a predetermined velocity threshold, and compare the height metric to a predetermined height threshold. For example, if the velocity magnitude is determined to be between a first threshold and a second threshold (indicative that the person is not in a standing supported state such as leaning against a wall, but they are also not walking), and the height metric is above the predetermined height threshold it can be concluded the person is in a free-standing state.

At step S808 in order to detect and classify the state of a person as being in a free-standing state the CPU 202 may supply the velocity determined at step S804 and at least one of: (i) the spatial distribution of the measurements of the reflections associated with the person conveyed in the output of the active reflected wave detector determined at step S806; and (ii) the height metric determined at step S806, into a trained classifier module running on the CPU 202.

At step S808, the trained classifier module may be used at operation time to determine a likelihood (e.g. a classification confidence score) that the received parameters correspond to a training data set associated with a person being in a free-standing state, and if the classification confidence score is greater than a threshold then the person is determined to be in that state. For example, the CPU 202 may determine that the person is in a free-standing state if the output of the classifier determines that there is more than a 60% likelihood (or some other predefined likelihood threshold, which may optionally be greater than 50%, to be conservative in not misclassifying a fall state as a non-fall state) of the person being in a free-standing state.

Once the CPU 202 has determined that the person is in a free-standing state the CPU 202 may control transmission of a notification that the person is in a free-standing state.

The issuance of the notification may be performed in various ways. For example the CPU 202 may transmit an alert message to a remote device (not shown in FIG. 1) via a wired or wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control panel in the environment 100 (e.g. a wall mounted control panel).

It will be appreciated that the above described embodiments may be combined. That is, the CPU 202 may be operable to classify a person in the environment as being in one or more of: a safe supported state, a crawling state, a fall state and a free-standing state; regardless as to whether this is done by determining one or more parameters associated with the measured wave reflections and then comparing the parameter(s) to one or more thresholds to detect and classify the state of a person, or supplying the determined parameter (s) as inputs into trained classifier module running on the CPU 202.

In particular, when using the trained classifier module, the trained classifier module may be trained with training data sets associated with a person being in one or more of: a safe supported state, a crawling state, a fall state and a free-standing state and determines which of the states the reflective wave measurements are most closely correlated to (for example by determining a classification confidence score for each of the states and classifying the person as being in a state that is associated with the highest classification confidence score). Thus it can be seen that the training data sets may be used to map the inputs to a plurality of possible output states. As noted above, there may be a training data set associated with the safe supported state or there may be multiple training data sets associated with specific safe supported states.

In embodiments where the velocity of the person in the environment is determined, this may further comprises verifying that the person has moved location in said environment, based on analysing the measurements of reflections associated with the person conveyed in the output of the active reflected wave detector. In particular, the velocity of the person as a whole may be considered to be moving because they move their arms but their legs are still in the same place so they haven't really moved across the environment. So this could be resolved by verifying, that after some time window, that all of the object has moved.

In one example, the CPU 202 may perform this verification by defining a respective regions at a first time and a second time that encompass all of the measurement points reflected from the body. If the regions at the first time and second time are not overlapping, then the CPU 202 can determine that the object (person) has, as a whole, moved. Determining that the person has moved across the environment over a predetermined time period may comprise determining a displacement between a location of the person in the environment determined at a first time and a location of the person in the environment determined at a later second time. The CPU 202 may control the active reflected wave detector 206 to switch into a lower power consumption operating mode between the two measurements.

Alternatively if the velocity of a weighted center of the object is above a threshold it can be determined that the object (person) has, as a whole, moved (thus there would be no need to compare measurement points reflected from the body taken at different times).

In embodiments where the velocity of the person in the environment is determined the CPU 202 may determine a plurality of velocity magnitude measurements of the person corresponding to different time periods, each of these velocity magnitude measurements determined using the reflections associated with the person conveyed in the output of the active reflected wave detector.

Each of the plurality of velocity magnitude measurements may be a speed measurement or it may be a magnitude component of a velocity measurement, the velocity measurement comprising a velocity magnitude and a velocity direction. As is known, speed describes how fast the person is travelling, while velocity describes how fast and in which direction the person is travelling. When a plurality of a speed measurements are taken, it is not necessary to determine the direction the person is travelling in.

The use of a plurality of velocity magnitude measurements of the person can increase the accuracy of the classification performed by the CPU 202 because it avoids the classification being performed based on a momentary movement of the person not reflective of their actual state. That is, in the above described embodiments rather than a single velocity measurement being compared to one or more thresholds, the plurality of velocity magnitude measurements may be summed or averaged and this resulting velocity value may be compared to the threshold(s) in the classification methods described above. Similarly, rather than a single velocity measurement being fed into into a trained classifier module running on the CPU 202, the plurality of velocity magnitude measurements may be summed or averaged and this resulting velocity value may be fed into into a trained classifier module running on the CPU 202.

In the embodiments described herein, the CPU 202 may accumulate the plurality of velocity magnitude measurements to determine a total distance travelled by a centre of mass of the person over a first time window, the velocity magnitude measurements corresponding to different respective times. The different times may be treated as respective short time periods (for example, equal to the time between successive frames from the active reflected wave detector). The CPU 202 can then use the total distance travelled in the classification. Movement of the person's centre of mass is well correlated with the movement of the weighted centre of the measurement points of reflections reflected off the person's body. Therefore, movement of the person's centre of mass can be approximated as the movement of the weighted centre of the measurement points of reflections reflected off the person's body. As is known, speed is a scalar having a value to the magnitude of the velocity. Each of the plurality of velocity magnitude measurements at the different times may be integrated to determine the total distance travelled in the time window. In order to classify the person as being in a particular state the CPU 202 may compare the total distance travelled to a distance threshold, or supply the total distance travelled as an input into a trained classifier module running on the CPU 202.

Additionally or alternatively, the CPU 202 may determine a total displacement of the centre of mass of said person across the environment over a second time window, and the classification may be further based on the total displacement. In some implementations, the second time window may be the same as the first time window referred to above. In other implementations, the second time window may be different to the first time window referred to above. The total displacement corresponds to the person's displacement (i.e. change of location) at the end of the second time window compared with the start of the second time window. The CPU 202 may determine the total displacement of the person in 1-dimensional space (if for example the active reflected wave detector 206 is a Doppler-only detector, or is a 1-dimensional ranging device), 2-dimensional space, or 3-dimensional space.

As noted above there are various methods of verifying that the person has moved location in the environment based on analysing the measurements of reflections associated with the person conveyed in the output of the active reflected wave detector e.g. determining a location of the person in the environment determined at a first time and a location of the person in the environment determined at a later second time, and then determining the displacement as the distance between those locations.

Displacement over a time window may alternatively be calculated based on calculating the definite integral of the velocity over that time window. Since velocity is a vector having both a velocity magnitude and a velocity direction, then as would be understood by a person skilled in art, in embodiments where a plurality of velocity measurements are taken over the course of the time window, the definite integral can be estimated based on a sum or average of the velocity measurements. This contrasts with determining total distance travelled over the period which is the definite integral of the velocity magnitudes only. For example in 1-dimensional space this would mean using the absolute value of the velocity. Thus velocities having equal and opposite directions do not cancel each other out when determining the total distance travelled.

In order to classify the person as being in a particular state the CPU 202 may compare the total displacement to a displacement threshold, or supply the total displacement as an input into a trained classifier module running on the CPU 202.

Using a plurality of velocity magnitude measurements of the person can be used to determine if the person is oscillating about a position (e.g. wobbling or swaying) or not. By oscillating about a certain position, the person is moving back and forth (e.g. by swaying or wobbling, perhaps subtly) so their displacement (i.e. the change in their position) at the end of a time window compared with the start will be zero or close to zero if the person is only wobbling or swaying over the course of the time window.

The absence of wobbling can be used by the CPU 202 to classify the person as being in a standing supported state (e.g. the person is using a frame or leaning against a wall) or more generally a safe supported state, instead of for example the person being in a free-standing state. This is because it is expected that being in a free-standing state will involve some wobbling or swaying. Even if a person has some degree of wobbling or swaying when standing supported, it would generally be significantly less than when free-standing. It's useful to know that a person is using such an aid because they if are standing without one they are at a greater risk of falling. Similarly, the presence of wobbling can be used by the CPU 202 to classify the person as being in a free standing state instead of a standing supported state or more generally a safe supported state.

To determine if the person is wobbling, the CPU 202 may accumulate the plurality of velocity magnitude measurements to determine a total distance travelled by a centre of mass of the person over a time window comprising the different time periods over which the plurality of velocity magnitude measurements were taken. The CPU 202 can then use the total distance travelled in the classification at step S508.

In both of the standing supported state and the free standing state, the person's displacement (i.e. the change in their position) will be zero or close to zero. It will be appreciated that the total distance moved by a person's centre of mass may be non-zero even if their feet have not moved, for example if they have swayed back and forth. To provide a high level of confidence that the person has wobbled and not simply moved location, it is advantageous to know that the person has not significantly displaced e.g. that their total displacement is less than a threshold. Otherwise it would not be known to what extent their distance travelled was simply displacement.

In embodiments in which the safe supported state classification performed at step S508 uses a plurality of velocity magnitude measurements, the CPU 202 may additionally compare the total distance travelled by the person to a distance threshold, and before classifying that the person is in a safe supported state the CPU 202 may verify that the total distance travelled is below the distance threshold (no wobbling is detected). Additionally or alternatively, the CPU 202 may compare the person's total displacement to a displacement threshold, and before classifying that the person is in a safe supported state the CPU 202 may verify that the person's total displacement is below the displacement threshold. Additionally or alternatively, the CPU 202 may classify that the person is in a safe supported state based on the person's maximum velocity magnitude having a value that is within a predetermined velocity range associated with the safe supported state. For the safe supported state classification at step S508, the CPU 202 may supply the total distance travelled by the person and/or the person's total displacement and/or the person's maximum velocity magnitude (or more generally all of their velocity magnitude measurements) as an input into a trained classifier module running on the CPU 202.

In embodiments in which the crawling state classification performed at step S608 uses a plurality of velocity magnitude measurements, the CPU 202 may additionally compare the total distance travelled by the person to a distance threshold, and before classifying that the person is in a crawling state the CPU 202 may verify that the total distance travelled is above the distance threshold (to verify that the person has not merely rolled over or moved a limb when in a fall state). Additionally or alternatively, the CPU 202 may compare the person's total displacement to a displacement threshold, and before classifying that the person is in a crawling state the CPU 202 may verify that the person's total displacement is above the displacement threshold. Additionally or alternatively, the CPU 202 may classify that the person is in a crawling state based on a velocity magnitude measurement or measurements of the person (e.g their maximum and/or minimum velocity) having a value that is within a predetermined velocity range associated with the crawling state. For the crawling state classification at step S608, the CPU 202 may supply the total distance travelled by the person and/or the person's total displacement and/or one or more velocity magnitude measurements as an input into a trained classifier module running on the CPU 202.

In embodiments in which the fall state classification performed at step S708 uses a plurality of velocity magnitude measurements, the CPU 202 may additionally compare the total distance travelled by the person to a distance threshold, and before classifying that the person is in a fall state the CPU 202 may verify that the total distance travelled is below the distance threshold. Additionally or alternatively, the CPU 202 may compare the person's total displacement to a displacement threshold, and before classifying that the person is in a fall state the CPU 202 may verify that the person's total displacement is below the displacement threshold. Additionally or alternatively, the CPU 202 may classify that the person is in a fall state based on the person's maximum velocity magnitude having a value that is within a predetermined velocity range associated with the fall state. For the fall state classification at step S708, the CPU 202 may supply the total distance travelled by the person and/or the person's total displacement and/or the person's maximum velocity magnitude (or more generally all of their velocity magnitude measurements) as an input into a trained classifier module running on the CPU 202.

In embodiments in which the free-standing state classification performed at step S808 uses a plurality of velocity magnitude measurements, the CPU 202 may additionally compare the total distance travelled by the person to a first (lower) distance threshold and a second (upper) threshold, and before classifying that the person is in a free-standing state the CPU 202 may verify that the total distance travelled is between the first (lower) threshold and the second (upper) threshold. For example, the first threshold may differentiate between the person being supported by an object of the environment and either free-standing or walking; while the second threshold may be differentiation between the person walking and either free-standing or standing supported). Additionally or alternatively, the CPU 202 may compare the person's total displacement to a displacement threshold, and before classifying that the person is in a free-standing state the CPU 202 may verify that the person's total displacement is below the displacement threshold.

Additionally or alternatively, the CPU 202 may classify that the person is in a free-standing state based on the person's maximum velocity magnitude having a value that is within a predetermined velocity range associated with the free-standing state. For the free-standing state classification at step S808, the CPU 202 may supply the total distance travelled by the person and/or the person's total displacement and/or the person's maximum velocity magnitude (or more generally all of their velocity magnitude measurements) as an input into a trained classifier module running on the CPU 202.

Whilst embodiments have been described above with reference to the classification performed by the CPU 202 using a velocity measurement or a plurality of velocity magnitude measurements of the person corresponding to different time periods, in other embodiments, the classification performed by the CPU 202 may be based on a height metric associated with at least one reflection from the person conveyed in the output of the active reflected wave detector; and determining a total displacement of a centre of mass of the person across the environment over a time period, and the classifying is further based on the total displacement.

As noted above determining that the person have moved across the environment over a predetermined time period may comprise determining a displacement between a location of the person in the environment determined at a first time and a location of the person in the environment determined at a later second time. The CPU 202 may control the active reflected wave detector 206 to switch into a lower power consumption operating mode between the two measurements.

As will be appreciated the displacement can be calculated by determining the location of the person at the first time and determining the location of the person at the second time to determine the distance between the locations at the respective times. However, in other embodiments the displacement can be calculated by integrating (e.g. by summing or a predetermined time period, or by averaging) a plurality of time sequential velocity measurements (i.e. including both magnitude and direction).

As will be appreciated the plurality of velocity measurements and velocity magnitude measurements at different times, as referred to herein are ideally evenly spaced in the time domain at with a sampling frequency preferably faster (more preferably at least two times faster) than the maximum frequency with which a person can be expected to move, so that their accumulation (e.g. by summing or averaging) is representative of an integration.

As will also be appreciated the duration over which total displacement or total distance is calculated will generally be over a known duration of time, and the known duration of time may be used for calibration purposes. Further, the known duration may advantageously be kept relatively small (e.g. less than 10 seconds, less than 5 seconds, or even less than 1 second) to reduce the likelihood of the person having a combination of different standing states during the time window.

Aspects of the present disclosure are defined below with reference to the following clauses:

A first embodiment, which is a computer implemented method of determining a state of a person in an environment. The method comprises:

receiving an output of an active reflected wave detector;
   classifying a state of the person as being in a safe supported state based on the output of the active reflected wave detector, wherein said classifying uses measurements of reflections associated with the person conveyed in the output of the active reflected wave detector, and said classifying is based at least on:
   a height metric associated with at least one reflection from the person conveyed in the output of the active reflected wave detector; and
   a plurality of velocity magnitude measurements of the person corresponding to different times, each of said velocity magnitude measurements determined using the reflections associated with the person conveyed in the output of the active reflected wave detector.

A second embodiment, which is the computer implemented method of the first embodiment, the method comprising classifying the state of the person as being in a safe supported state based on:

determining the person is not in a fall position based on the height metric; and determining one or more of the velocity magnitudes of the person present in the environment is below a velocity threshold.

A third embodiment, which is the computer implemented method of any preceding embodiment, wherein said classifying is further based on a horizontal spatial distribution and/or a vertical spatial distribution of the measurements of the reflections associated with the person conveyed in the output of the active reflected wave detector.

A fourth embodiment, which is the computer implemented method of the third embodiment, the method comprising classifying the state of the person as being in a safe supported state based on determining a variance of the vertical spatial distribution of the measurements of the reflections.

A fifth embodiment, which is the computer implemented method of any preceding embodiment, wherein the height metric comprises an average vertical height of the reflections associated with the person that are conveyed in the output of the active reflected wave detector.

The sixth embodiment, which is the computer implemented method of any preceding embodiment, wherein the height metric comprises a maximum height of multiple reflections from a body of said person or a portion thereof that are conveyed in the output of the active reflected wave detector.

The seventh embodiment, which is the computer implemented method of any preceding embodiment, wherein the height metric comprises a height of a weighted centre of the reflections associated with the person that are conveyed in the output of the active reflected wave detector.

The eighth embodiment, which is the computer implemented method of the fourth embodiment, the method comprising classifying the state of the person as being in a safe supported state based on determining that the variance of the vertical spatial distribution of the measurements of the reflections is below a variance threshold.

The ninth embodiment, which is the computer implemented method of any of the fifth embodiment to the seventh embodiment, the method comprising classifying the state of the person as being in a safe supported state based on determining that the height metric is above a height threshold.

The tenth embodiment, which is the computer implemented method of any preceding embodiment, wherein said classifying is performed by a classifier that has been trained with training data said classifying comprising determining a classification confidence score and comparing the classification confidence score with a threshold to classify the state of the person as being in a safe supported state The eleventh embodiment, which is the computer implemented method of the tenth embodiment, wherein said training data comprises a training data set that corresponds to a person being in a safe supported state.

The twelfth embodiment, which is the computer implemented method of the tenth embodiment, wherein said training data comprises at least one training data set that each corresponds to a person being in a respective specific safe supported state The thirteenth embodiment, which is the computer implemented method of the twelfth embodiment, wherein said classifying comprises determining a classification confidence score indicative of correlation between the reflections associated with the person conveyed in the output of the active reflected wave detector and each of the least one training data set.

The fourteenth embodiment, which is the computer implemented method of the twelfth embodiment or the thirteenth embodiment, wherein said at least one training data set comprises at least one of: a training data set associated with a person being in a lying down state, and a training data set associated with a person being in a sitting state.

The fifteenth embodiment, which is the computer implemented method of any of the twelfth embodiment to the fourteenth embodiment, wherein said at least one training data set comprises a training data set associated with a person being in a standing supported state.

The sixteenth embodiment, which is the computer implemented method of any of the twelfth embodiment to the fourteenth embodiment, wherein said classifying comprises computing a classification confidence score indicative of a likelihood that the person in the environment is in a state other than any of the at least one specific safe supported state.

The seventeenth embodiment, which is the computer implemented method of any preceding embodiment, the method further comprising controlling transmission of a notification that the person is in a safe supported state or a specific safe supported state.

The eighteenth embodiment, which is the computer implemented method of any preceding embodiment, wherein said classifying comprises classifying the person as being in a standing supported state.

The nineteenth embodiment, which is the computer implemented method of any of the first embodiment to the seventeenth embodiment, wherein said classifying comprises classifying the person as being in a reclined supported state.

The twentieth embodiment, which is the computer implemented method of the nineteenth embodiment, wherein said classifying comprises classifying the person as being in sitting position or an elevated lying down position.

The twenty-first embodiment, which is the computer implemented method of any preceding embodiment, further comprising accumulating the velocity magnitude measurements to determine a total distance travelled by a centre of mass of said person over a first time period comprising said different times, and said classifying is further based on the total distance.

The twenty-second embodiment, which is the computer implemented method of claim preceding embodiment, further comprising determining a total displacement of a centre of mass of said person across said environment over a second time period, and said classifying is further based on the total displacement.

The twenty-third embodiment, which is the computer implemented method of any preceding embodiment, wherein the active reflected wave detector is a radar sensor.

The twenty-fourth embodiment, which is the computer implemented method of any of the first embodiment to the twenty-second embodiment, wherein the active reflected wave detector is a sonar sensor.

A twenty-fifth embodiment, which is a non-transitory computer-readable storage medium comprising instructions which, when executed by a processor of a device cause the processor to perform the method of any preceding embodiment.

A twenty-sixth embodiment, which is a device for determining a state of a person in an environment. The device comprises a processor configured to:

receive an output of an active reflected wave detector;
classify a state of the person as being in a safe supported state based on the output of the active reflected wave detector, wherein said classification uses measurements of reflections associated with the person conveyed in the output of the active reflected wave detector, and said classification is based at least on:
a height metric associated with at least one reflection from the person conveyed in the output of the active reflected wave detector; and
a plurality of velocity magnitude measurements of the person corresponding to different times, each of said plurality of velocity magnitude measurements determined using the reflections associated with the person conveyed in the output of the active reflected wave detector.

A twenty-seventh embodiment, which is the device of the twenty-sixth embodiment wherein the processor is configured to perform the method of any one of the first embodiment to the twenty-fourth embodiment.

A twenty-eighth embodiment, which is the device of any of the twenty-sixth embodiment or the twenty-seventh embodiment, wherein the device further comprises the active reflected wave detector.

A twenty-ninth embodiment, which is a computer implemented method of determining a state of a person in an environment. The method comprises:

receiving an output of an active reflected wave detector;
classifying the state of the person as being in a crawling state based on the output of the active reflected wave detector, wherein said classifying uses measurements of reflections associated with the person conveyed in the output of the active reflected wave detector, and said classifying is based at least on:
a plurality of velocity magnitude measurements of the person corresponding to different times, each of said plurality of velocity magnitude measurements determined using the reflections associated with the person conveyed in the output of the active reflected wave detector; and a height metric associated with at least one reflection from the person conveyed in the output of the active reflected wave detector.

A thirtieth embodiment, which is the computer implemented method of the twenty-ninth embodiment, the method comprising classifying the state of the person as being in a crawling state based on:

determining that a velocity of the person present in the environment is above a velocity threshold; and
determining that the height metric is below a height threshold.

A thirty-first embodiment, which is the computer implemented method of the twenty-ninth embodiment, wherein said classifying is performed by a classifier that has been trained with training data, said classifying comprising determining a classification confidence score and comparing the classification confidence score with a threshold to classify the state of the person as being in a crawling state.

A thirty-second embodiment, which is the computer implemented method of any of the twenty-ninth embodiment to the third-first embodiment, wherein said classifying is further based on detecting, based on said measurements of reflections associated with the person conveyed in the output of the active reflected wave detector, that the person has moved location in said environment.

A thirty-third embodiment, which is the computer implemented method of any of the twenty-ninth embodiment to the thirty-second embodiment, the method further comprising controlling transmission of a notification that the person is in a crawling state.

A thirty-fourth embodiment, which is the computer implemented method of any of the twenty-ninth embodiment to the thirty-third embodiment, wherein said classifying is further based on a spatial distribution of the measurements of the reflections associated with the person conveyed in the output of the active reflected wave detector.

A thirty-fifth embodiment, which is the computer implemented method of the thirty-fourth embodiment, wherein said classifying is based on a vertical spatial distribution and/or horizontal spatial distribution of the measurements of the reflections associated with the person conveyed in the output of the active reflected wave detector.

A thirty-sixth embodiment, which is the computer implemented method of the thirty-fifth embodiment, wherein said classifying is based on the vertical spatial distribution of the measurements of the reflections associated with the person conveyed in the output of the active reflected wave detector compared to a horizontal spatial distribution of the measurements of the reflections associated with the person conveyed in the output of the active reflected wave detector.

A thirty-seventh embodiment, which is the computer implemented method of any of the twenty-fifth embodiment to the thirty-seventh embodiment, further comprising accumulating the velocity magnitude measurements to determine a total distance travelled by a centre of mass of said person over a first time period comprising said different times, and said classifying is further based on the total distance.

A thirty-eighth embodiment, which is the computer implemented method of any of the twenty-ninth embodiment to the thirty-seventh embodiment, further comprising determining a total displacement of a centre of mass of said person across said environment over a second time period, and said classifying is further based on the total displacement.

A thirty-ninth embodiment, which is the computer implemented method of any of the twenty-ninth embodiment to the thirty-eighth embodiment, wherein the active reflected wave detector is a radar sensor.

A fortieth embodiment, which is the computer implemented method of any of the twenty-ninth embodiment to the thirty-eighth, wherein the active reflected wave detector is a sonar sensor.

A forty-first embodiment, which is the computer implemented method of any of the twenty-ninth embodiment to the thirty-forteith embodiment, wherein the height metric comprises a height of a weighted centre of the reflections associated with the person conveyed in the output of the active reflected wave detector.

A forty-second embodiment, which is the computer implemented method of any of the twenty-ninth embodiments to the forty-first embodiment, wherein the height metric comprises an average vertical height of the reflections associated with the person that are conveyed in the output of the active reflected wave detector.

A forty-third embodiment, which is the computer implemented method of any of twenty-ninth embodiment to the forty-second embodiment, wherein the height metric comprises a maximum height of multiple reflections from a body of said person or a portion thereof that are conveyed in the output of the active reflected wave detector.

A forty-fourth embodiment, which is a non-transitory computer-readable storage medium comprising instructions which, when executed by a processor of a device cause the processor to perform the method of any of the twenty-ninth embodiment to the forty-third embodiment.

A forty-third embodiment, which is a device for determining a state of a person in an environment. The device comprises a processor configured to:

receive an output of an active reflected wave detector;

classify the state of the person as being in a crawling state based on the output of the active reflected wave detector, wherein said classification uses measurements of reflections associated with the person conveyed in the output of the active reflected wave detector, and said classification is based at least on:

a plurality of velocity magnitude measurements of the person corresponding to different times, each of said plurality of velocity magnitude measurements determined using the reflections associated with the person conveyed in the output of the active reflected wave detector; and a height metric associated with at least one reflection from the person conveyed in the output of the active reflected wave detector.

A forty-sixth embodiment, which is the device of the forty-fifth embodiment wherein the processor is configured to perform the method of any one of the twenty-ninth embodiment to the forty-third embodiment.

A forty-seventh embodiment, which is the device of the forty-fifth embodiment or the forty-sixth embodiment, wherein the device further comprises the active reflected wave detector.

A forty-eight embodiment, which is a computer implemented method of determining a state of a person in an environment. The method comprises:

receiving an output of an active reflected wave detector;

classifying a state of the person as being in a free-standing state based on the output of the active reflected wave detector, wherein said classifying uses measurements of reflections associated with the person conveyed in the output of the active reflected wave detector, and said classifying is based at least on:

a plurality of velocity magnitude measurements of the person corresponding to different times, each of said plurality of velocity magnitude measurements determined using the reflections associated with the person conveyed in the output of the active reflected wave detector; and at least one of: (i) a spatial distribution of the measurements of the reflections associated with the person conveyed in the output of the active reflected wave detector; and (ii) a height metric associated with at least one reflection from the person conveyed in the output of the active reflected wave detector.

A forty-ninth embodiment, which is the computer implemented method of the forty-eight emobidment, wherein said classifying comprises determining that a velocity of the person is between a first velocity threshold and a second velocity threshold.

A fiftieth embodiment, which is the computer implemented method of the forty-eighth embodiment, or the forty-ninth embodiment, wherein said classifying is further based on a vertical spatial distribution and/or a horizontal distribution of the measurements of the reflections associated with the person conveyed in the output of the active reflected wave detector.

A fifty-first embodiment, which is the computer implemented method of the fiftieth embodiment, wherein said classifying is based on the vertical spatial distribution of the measurements of the reflections associated with the person conveyed in the output of the active reflected wave detector compared to a horizontal spatial distribution of the measurements of the reflections associated with the person conveyed in the output of the active reflected wave detector.

A fifty-second embodiment, which is the computer implemented method of any of the forty-eighth embodiment to the fifty-first embodiment, the method comprising classifying the state of the person as being in a free-standing state based on determining that the height metric is above a height threshold.

A fifty-third embodiment, which is the computer implemented method of any of the forty-eighth emobidment to the fift-second embodiment, wherein the height metric comprises a height of a weighted centre of the reflections associated with the person conveyed in the output of the active reflected wave detector.

A fifty-fourth embodiment, which is the computer implemented method of any of the forty-eighth embodiment to the fifty-third embodiment clauses 48 to 53, wherein the height metric comprises an average vertical height of the reflections associated with the person that are conveyed in the output of the active reflected wave detector.

A fifty-fifth embodiment, which is the computer implemented method of any of the forty-eighth embodiment to the fifty-fourth embodiment, wherein the height metric comprises a maximum height of multiple reflections from a body of said person or a portion thereof that are conveyed in the output of the active reflected wave detector.

A fifty-sixth embodiment, which is the computer implemented method of any of the forty-eighth embodiment to the fifty-fifht embodiment, wherein said classifying is performed by a classifier that has been trained with training data, said classifying comprising determining a classification confidence score and comparing the classification confidence score with a threshold to classify the state of the person as being in a free-standing state.

A fifty-seventh embodiment, which is the computer implemented method of the forty-eighth embodiment to the fifty-fifth embodiment, wherein said training data comprises a training data set that corresponds to a person being in a free-standing state.

A fifty-eighth embodiment, which is the computer implemented method of any of the forty-eighth embodiment to the fifty-seventh embodiment, the method further comprising controlling transmission of a notification that the person is in a free-standing state.

A fifty-ninth embodiment, which is the computer implemented method of any of the forty-eighth embodiment to the fifty-eighth embodiment, further comprising accumulating the velocity magnitude measurements to determine a total distance travelled by a centre of mass of said person over a first time period comprising said different times, and said classifying is further based on the total distance.

A sixtieth embodiment, which is the computer implemented method of any of the forty-eighth embodiment to the fifty-ninth embodiment, further comprising determining a total displacement of a centre of mass of said person across said environment over a second time period, and said classifying is further based on the total displacement.

A sixty-first embodiment, which is the computer implemented method of any of the forty-eighth embodiment to the fifty-ninth embodiment, wherein the active reflected wave detector is a radar sensor.

A sixty-second embodiment, which is the computer implemented method of any of the forty-eighth embodiment to the sixtieth embodiment, wherein the active reflected wave detector is a sonar sensor.

A sixty-third embodiment, which is a non-transitory computer-readable storage medium comprising instructions which, when executed by a processor of a device cause the processor to perform the method of any of the forty-eighth embodiment to the sixty-second embodiment.

A sixty-fourth embodiment, which is a device for determining a state of a person in an environment. The device comprises a processor configured to:

receive an output of an active reflected wave detector;

classify a state of the person as being in a free-standing state based on the output of the active reflected wave detector, wherein said classification uses measurements of reflections associated with the person conveyed in the output of the active reflected wave detector, and said classification is based at least on:

a plurality of velocity magnitude measurements of the person corresponding to different times, each of said plurality of velocity magnitude measurements determined using the reflections associated with the person conveyed in the output of the active reflected wave detector; and at least one of: (i) a spatial distribution of the measurements of the reflections associated with the person conveyed in the output of the active reflected wave detector; and (ii) a height metric associated with at least one reflection from the person conveyed in the output of the active reflected wave detector.

A sixty-fifth embodiment, which is the device of clause 64 wherein the processor is configured to perform the method of any of the forty-eighth embodiment to the sixty-second embodiment.

A sixty-sixth embodiment, which is the device of the sixty-fourth embodiment or the sixty-fifth embodiment, wherein the device further comprises the active reflected wave detector.

A sixty-seventh embodiment, which is a computer implemented method of determining a state of a person in an environment. The method comprises:

receiving an output of an active reflected wave detector;

classifying the state of the person based on the output of the active reflected wave detector, wherein said classifying uses measurements of reflections associated with the person conveyed in the output of the active reflected wave detector, and said classifying is based on:

a height metric associated with at least one reflection from the person conveyed in the output of the active reflected wave detector; and determining a total displacement of a centre of mass of said person across said environment over a time period, and said classifying is further based on the total displacement.

A sixty-eighth embodiment, which is the computer implemented method of the sixty-seventh embodiment, wherein the state of the person is a crawling state.

A sixty-ninth embodiment, which is the computer implemented method of the sixty-eighth embodiment, the method comprising classifying the state of the person as being in a crawling state based on:

determining that the velocity of the person present in the environment is above a velocity threshold; and determining that the height metric is below a height threshold.

A seventieth embodiment, which is the computer implemented method of the sixty-eighth embodiment, wherein said classifying is performed by a classifier that has been trained with training data, said classifying comprising determining a classification confidence score and comparing the classification confidence score with a threshold to classify the state of the person as being in a crawling state.

A seventy-first embodiment, which is the computer implemented method of any of the sixty-eighth embodiment to the seventieth embodiment, wherein said classifying is further based on detecting, based on said measurements of reflections associated with the person conveyed in the output of the active reflected wave detector, that the person has moved location in said environment.

A seventy-second embodiment, which is the computer implemented method of the sixty-seventh embodiment, wherein the state of the person is that the person is in a fall position.

A seventy-third embodiment, which is the computer implemented method of the seventy-second embodiment, the method comprising classifying the state of the person as being in a fall position based on:

determining that the velocity of the person present in the environment is below a velocity threshold; and
    determining that the height metric is below a height threshold.

A seventy-fourth embodiment, which is the computer implemented method of the seventy-third embodiment, wherein said classifying is performed by a classifier that has been trained with training data, said classifying comprising determining a classification confidence score and comparing the classification confidence score with a threshold to classify the state of the person as being in a fall position.

A seventy-fifth embodiment, which is the computer implemented method of any of the sixty-seventh embodiment to the seventy-fifth embodiment, wherein said classifying is based on determining that the person has not moved across the environment over the predetermined time period using the reflections associated with the person conveyed in the output of the active reflected wave detector.

A seventy-sixth embodiment, which is the computer implemented method of any of the sixty-seventh embodiment to the seventy-fifth embodiment, wherein said classifying is further based on a spatial distribution of the measurements of the reflections associated with the person conveyed in the output of the active reflected wave detector.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of determining a state of a person in an environment, the method comprising:

receiving an output of an active reflected wave detector;
    based on the output of the active reflected wave detector, classifying a state of the person as being in any one of:
        a first standing state, wherein the first standing state comprises standing without oscillating about a position; or
        a second standing state, wherein the second standing state comprises standing with oscillating about a position;
    wherein said classifying uses measurements of reflections associated with the person conveyed in the output of the active reflected wave detector, and said classifying is based at least on:
    a plurality of velocity magnitude measurements of the person corresponding to different times, each of said velocity magnitude measurements determined using the reflections associated with the person conveyed in the output of the active reflected wave detector; and at least one of:

(i) a spatial distribution of the measurements of the reflections associated with the person conveyed in the output of the active reflected wave detector; or
    (ii) a height metric associated with at least one reflection from the person conveyed in the output of the active reflected wave detector.

2. The computer implemented method of claim 1, the method comprising classifying the state of the person as being in any one of the first standing state or the second standing state based on:

determining the person is not in a fall position based on the height metric; and
    determining one or more of the velocity magnitudes of the person present in the environment is below a velocity threshold.

3. The computer implemented method of claim 1, wherein the height metric comprises one or more of:

an average vertical height of the reflections associated with the person that are conveyed in the output of the active reflected wave detector;
    a maximum height of multiple reflections from a body of said person or a portion thereof that are conveyed in the output of the active reflected wave detector; and
    a height of a weighted centre of the reflections associated with the person that are conveyed in the output of the active reflected wave detector.

4. The computer implemented method of claim 1, further comprising accumulating the velocity magnitude measurements to determine a total distance travelled by a centre of mass of said person over a first time period comprising said different times, and said classifying is further based on the total distance.

5. The computer implemented method of claim 1, further comprising determining a total displacement of a centre of mass of said person across said environment over a second time period, and said classifying is further based on the total displacement.

6. The computer implemented method of claim 1, wherein the active reflected wave detector is a radar sensor.

7. The computer implemented method of claim 1, wherein the first standing state comprises standing in a still state, and the second standing state comprises standing in a still state.

8. A non-transitory computer-readable storage medium comprising instructions which, when executed by a processor of a device cause the processor to perform the method of claim 1, wherein the first standing state comprises standing in a still state, and the second standing state comprises standing in a still state.

9. The computer-implemented method of claim 1, wherein classifying the state of the person as being in the first standing state comprises classifying the person as standing with support of an object, and classifying the state of the person as being in the second standing state comprises classifying the person as standing without support of an object.

10. A non-transitory computer-readable storage medium comprising instructions which, when executed by a processor of a device cause the processor to perform a method of determining a state of a person in an environment, the method comprising:

receiving an output of an active reflected wave detector;
    based on the output of the active reflected wave detector, classifying a state of the person as being in any one of:
        a first standing state, wherein the first standing state comprises standing without oscillating about a position; or a second standing state, wherein the second standing state comprises standing with oscillating about a position;

wherein said classifying uses measurements of reflections associated with the person conveyed in the output of the active reflected wave detector, and said classifying is based at least on:

a plurality of velocity magnitude measurements of the person corresponding to different times, each of said velocity magnitude measurements determined using the reflections associated with the person conveyed in the output of the active reflected wave detector; and at least one of:

(i) a spatial distribution of the measurements of the reflections associated with the person conveyed in the output of the active reflected wave detector; or (ii) a height metric associated with at least one reflection from the person conveyed in the output of the active reflected wave detector.

11. The non-transitory computer-readable storage medium of claim 10, wherein the method further comprises accumulating the velocity magnitude measurements to determine a total distance travelled by a centre of mass of said person over a first time period comprising said different times, and said classifying is further based on the total distance.

12. The non-transitory computer-readable storage medium of claim 11, wherein the method further comprises determining a total displacement of a centre of mass of said person across said environment over a second time period, and said classifying is further based on the total displacement.

13. The non-transitory computer-readable storage medium of claim 10, wherein classifying the state of the person as being in the first standing state comprises classifying the person as standing with support of an object, and classifying the state of the person as being in the second standing state comprises classifying the person as standing without support of an object.

14. A device for determining a state of a person in an environment, the device comprising a processor configured to:

receive an output of an active reflected wave detector;

based on the output of the active reflected wave detector, classify a state of the person as being in either:

a first standing state, wherein the first standing state comprises standing without oscillating about a position; or a second standing state, wherein the second standing state comprises standing with oscillating about a position;

wherein said classification uses measurements of reflections associated with the person conveyed in the output of the active reflected wave detector, and said classification is based at least on:

a plurality of velocity magnitude measurements of the person corresponding to different times, each of said plurality of velocity magnitude measurements determined using the reflections associated with the person conveyed in the output of the active reflected wave detector; and at least one of:

(i) a spatial distribution of the measurements of the reflections associated with the person conveyed in the output of the active reflected wave detector; or (ii) a height metric associated with at least one reflection from the person conveyed in the output of the active reflected wave detector.

15. The device of claim 14, wherein the processor is further configured to accumulate the velocity magnitude measurements to determine a total distance travelled by a centre of mass of said person over a first time period comprising said different times, and said classifying is further based on the total distance.

16. The device of claim 15, wherein the processor is further configured to determine a total displacement of a centre of mass of said person across said environment over a second time period, and said classifying is further based on the total displacement.

17. The device of claim 14, wherein the processor is configured to classify the state of the person as being in one of the first standing state or the second standing state based on determining that the height metric is above a height threshold.

18. The device of claim 14, wherein the first standing state comprises standing in a still state, and the second standing state comprises standing in a still state.

19. The device of claim 14, wherein classifying the state of the person as being in the first standing state comprises classifying the person as standing with support of an object, and classifying the state of the person as being in the second standing state comprises classifying the person as standing without support of an object.

20. The device of claim 14, wherein the active reflected wave detector is a radar sensor.

* * * * *